US012657946B1

(12) United States Patent
Shah et al.

(10) Patent No.: US 12,657,946 B1
(45) Date of Patent: Jun. 16, 2026

(54) MACHINE LEARNING-BASED TECHNIQUES FOR DIGITAL DATA EXTRACTION FROM DOCUMENTS WITH COMPLEX FORMATS

(71) Applicant: Insurance Quantified, LLC, Dover, DE (US)

(72) Inventors: Akash Sanjay Shah, Brooklyn, NY (US); Laurent Thanwerdas, Brooklyn, NY (US); Eduardo Ballesteros Grande, Madrid (ES); Robert Eady, London (GB); Dylan Huang, Jersey City, NJ (US); Maxime Paul Roger Fournes, London (GB)

(73) Assignee: Insurance Quantified, LLC, Dover, DE (US)

( * ) Notice: Subject to any disclaimer, the term of this patent is extended or adjusted under 35 U.S.C. 154(b) by 232 days.

(21) Appl. No.: 18/479,635

(22) Filed: Oct. 2, 2023

Related U.S. Application Data

(60) Provisional application No. 63/419,133, filed on Oct. 25, 2022.

(51) Int. Cl.
*G06V 30/413* (2022.01)
*G06V 10/82* (2022.01)
*G06V 30/418* (2022.01)

(52) U.S. Cl.
CPC ............ *G06V 30/413* (2022.01); *G06V 10/82* (2022.01); *G06V 30/418* (2022.01)

(58) Field of Classification Search
None
See application file for complete search history.

(56) References Cited

U.S. PATENT DOCUMENTS 8,175,394 B2 5/2012 Vincent et al.
11,210,473 B1 12/2021 Mariko et al.
(Continued)

FOREIGN PATENT DOCUMENTS

CN 106600423 A 4/2017
WO WO 2005/050545 A1 6/2005

OTHER PUBLICATIONS

U.S. Appl. No. 18/505,704, filed Nov. 9, 2023, Falandino et al.
(Continued)

*Primary Examiner* — Andrew H Lam
(74) *Attorney, Agent, or Firm* — Wolf, Greenfield & Sacks, P.C.

(57) ABSTRACT

The disclosure describes a method including: obtaining a document image containing fields spatially arranged along multiple dimensions; determining first locations within the image, each of the first locations identifying a spatial position in the image of a respective one of the fields; extracting tokens from the fields; generating using a first trained model, based at least on the image, the first locations, and the tokens, first predictions, each first prediction indicating a classification of a respective one of the tokens; generating, using a second trained model, based at least on the image, second predictions identifying second locations, each of the second locations identifying a spatial position in the image of a respective entry of multiple entries, each of the entries including one or more rows of tokens; and linking, according to the first locations and the second locations, each of the tokens to one of the entries.

20 Claims, 40 Drawing Sheets

(56)                    References Cited

U.S. PATENT DOCUMENTS

|  |  |  |  |  |
|---|---|---|---|---|
| 11,676,204 | B1 | 6/2023 | Fleming et al. | |
| 12,462,309 | B2 | 11/2025 | Bien et al. | |
| 2002/0035488 | A1* | 3/2002 | Aquila | G06Q 40/02 |
| | | | | 705/4 |
| 2003/0036934 | A1 | 2/2003 | Ouchi | |
| 2004/0128182 | A1 | 7/2004 | Pepoon | |
| 2005/0149376 | A1 | 7/2005 | Guyan | |
| 2009/0043615 | A1 | 2/2009 | Belhe | |
| 2009/0187429 | A1 | 7/2009 | Scalet | |
| 2013/0039571 | A1* | 2/2013 | Stein | G06V 10/457 |
| | | | | 382/219 |
| 2014/0324466 | A1 | 10/2014 | Wertzlkberger | |
| 2016/0012544 | A1 | 1/2016 | Ramaswamy | |
| 2016/0307200 | A1 | 10/2016 | Adams | |
| 2016/0342852 | A1 | 11/2016 | Blanchflower | |
| 2021/0383067 | A1* | 12/2021 | Reisswig | G06F 16/367 |
| 2022/0017032 | A1 | 1/2022 | Qi | |
| 2022/0214911 | A1 | 7/2022 | Scarfutti | |
| 2022/0392047 | A1* | 12/2022 | Wheaton | G06V 10/40 |
| 2024/0086734 | A1 | 3/2024 | Singh | |
| 2024/0161203 | A1* | 5/2024 | Falandino | G06Q 10/06311 |
| 2024/0161204 | A1 | 5/2024 | Bien | |
| 2024/0161530 | A1 | 5/2024 | Falandino et al. | |

OTHER PUBLICATIONS

U.S. Appl. No. 18/505,729, filed Nov. 9, 2023, Falandino et al.
U.S. Appl. No. 18/505,759, filed Nov. 9, 2023, Bien et al.
Carion, Nicolas, et al. "End-to-end object detection with transformers." European conference on computer vision. Cham: Springer International Publishing, 2020, 26 pages.
Xu, Yang, et al. "Layoutlmv2: Multi-modal pre-training for visually-rich document understanding." arXiv preprint arXiv:2012.14740 (2020), 13 pages.
Lopresti et al., Using Consensus Sequence Voting to Correct OCR Errors*. Computer Vision and Image Understanding. Jan. 3, 1996;67(1):39-47.

* cited by examiner

30

Policy Level Loss Detail Report No Loc

Program: CREST TRUCKING CONCEPTONE (WM) For policy VPA0329982

PROGRESSIVE TRANSPORTATION SER1360 W PACIFIC COAST HWY   LONG BEACH   CA90810

As of: 03/18/2019

| [LOC] Policy Number [Unit#] Location Name | Acc State LOB Status | Loss Date Report Date Close Date | Claimant Name Claim Number | Accident Description Loss Cause | Paid Loss | Paid Expense | Loss Reserve | Expense Reserve | Total Incurred |
|---|---|---|---|---|---|---|---|---|---|
| Losses for Policy 0329982, Mod - [00] - 09/02/2014 to 08/01/2015 | | | | | | | | | |
| Losses for LOC: (41) STATE NATIONAL INSURANCE CO | | | | | | | | | |
| [41] VPA 0329982-00 00001 HIRED AND NON-OWNED AUTO | CA AFV C | 10/27/2014 10/28/2014 01/20/2015 | UNKNOWN ALWM14012762 | The insured vehicle collided w PD | 0.00 | 0.00 | 0.00 | 0.00 | 0.00 |
| Claim No. ALWM14012762 Unit # 00001 | | | | Total | 0.00 | 0.00 | 0.00 | 0.00 | 0.00 |
| | | | | Total | 0.00 | 0.00 | 0.00 | 0.00 | 0.00 |
| Losses for LOC: (41) STATE NATIONAL INSURANCE CO | | | | | | | | | |
| [41] VPA 0329982-00 00003 GROSS RECEIPTS-VEH SCH ON FILE | CA AFV C | 09/19/2014 10/08/2014 01/09/2015 | CHEUNG    TONY ALWM14011895 | lane change caused accident PD | 0.00 | 0.00 | 0.00 | 0.00 | 0.00 |
| [41] VPA 0329982-00 00003 GROSS RECEIPTS-VEH SCH ON FILE | CA AFV C | 09/19/2014 10/08/2014 01/09/2015 | IRFAN    KASHAF ALWM14011895 | lane change caused accident PD | 0.00 | 0.00 | 0.00 | 0.00 | 0.00 |
| Claim No. ALWM14011895 | | | | | | | | | |
| Losses for LOC: (41) STATE NATIONAL INSURANCE CO | | | | | | | | | |
| [41] VPA 0329982-00 00003 GROSS RECEIPTS-VEH SCH ON FILE | CA AFV C | 09/30/2014 10/03/2014 08/22/2017 | LOZANA    VANESSA ALWM14011668 | The inured vehicle stuck the o PD | 0.00 | 80.00 | 0.00 | 0.00 | 80.00 |
| Claim No. ALWM14011668 | | | | Total | 0.00 | 80.00 | 0.00 | 0.00 | 80.00 |
| Policy Level Loss non LOC | | | | Total | 0.00 | 80.00 | 0.00 | 0.00 | 80.00 |

Page 1 of 27

Reported by Meadowbrook Insurance Group Inc.

FIG. 3

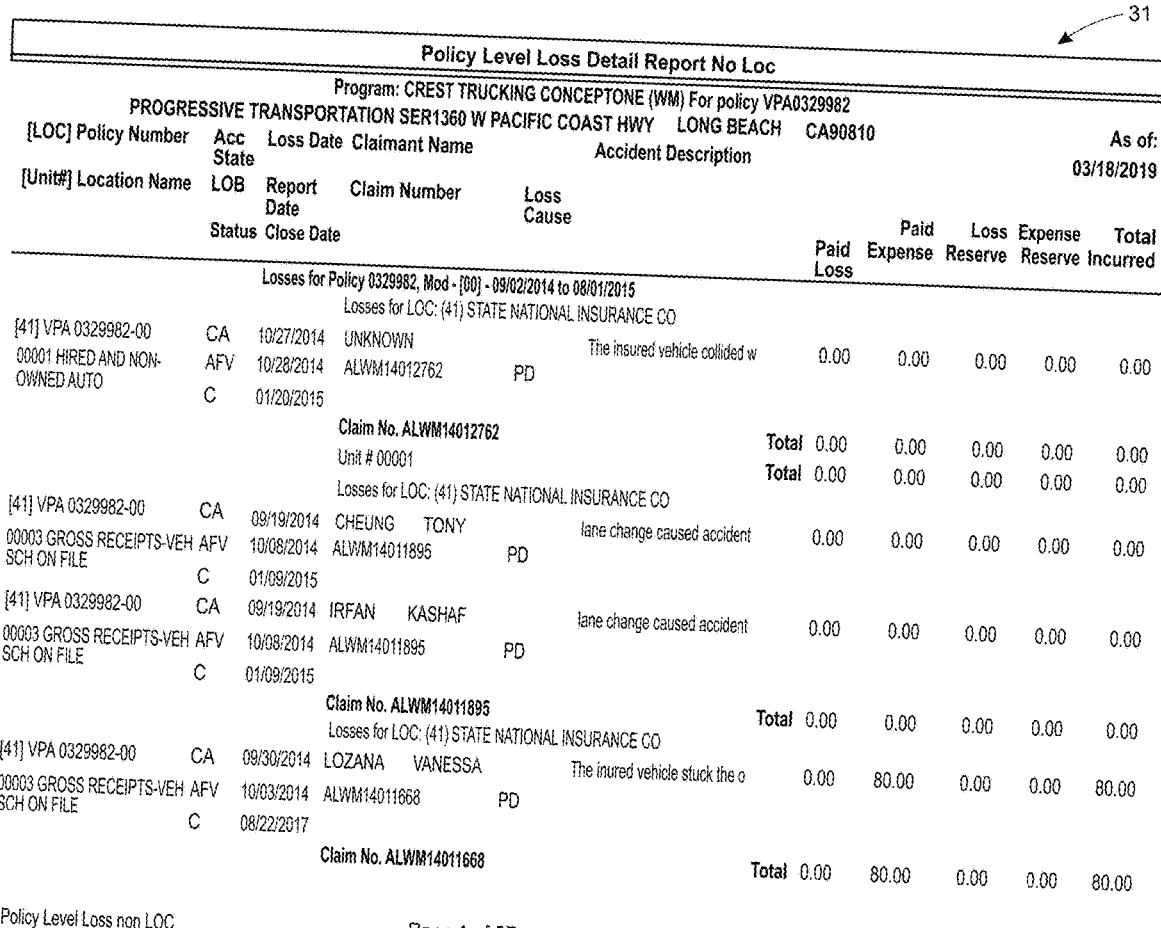

—31

| Policy Level Loss Detail Report No Loc | | | | | | | | | | |
|---|---|---|---|---|---|---|---|---|---|---|

Program: CREST TRUCKING CONCEPTONE (WM) For policy VPA0329982

PROGRESSIVE TRANSPORTATION SER1360 W PACIFIC COAST HWY    LONG BEACH    CA90810

| [LOC] Policy Number | Acc State | Loss Date | Claimant Name | Accident Description | | | | | | As of: 03/18/2019 |
|---|---|---|---|---|---|---|---|---|---|---|
| [Unit#] Location Name | LOB | Report Date | Claim Number | Loss Cause | | | | | | |
| | Status | Close Date | | | | Paid Loss | Paid Expense | Loss Reserve | Expense Reserve | Total Incurred |

Losses for Policy 0329982, Mod - [00] - 09/02/2014 to 08/01/2015

Losses for LOC: (41) STATE NATIONAL INSURANCE CO

| [41] VPA 0329982-00 | CA | 10/27/2014 | UNKNOWN | The insured vehicle collided w | | 0.00 | 0.00 | 0.00 | 0.00 | 0.00 |
| 00001 HIRED AND NON-OWNED AUTO | AFV | 10/28/2014 | ALWM14012762 | PD | | | | | | |
| | C | 01/20/2015 | | | | | | | | |

|  |  | Claim No. ALWM14012762 | | | Total | 0.00 | 0.00 | 0.00 | 0.00 | 0.00 |
|  |  | Unit # 00001 | | | Total | 0.00 | 0.00 | 0.00 | 0.00 | 0.00 |

Losses for LOC: (41) STATE NATIONAL INSURANCE CO

| [41] VPA 0329982-00 | CA | 09/19/2014 | CHEUNG    TONY | lane change caused accident | | 0.00 | 0.00 | 0.00 | 0.00 | 0.00 |
| 00003 GROSS RECEIPTS-VEH SCH ON FILE | AFV | 10/08/2014 | ALWM14011895 | PD | | | | | | |
| | C | 01/09/2015 | | | | | | | | |
| [41] VPA 0329982-00 | CA | 09/19/2014 | IRFAN    KASHAF | lane change caused accident | | 0.00 | 0.00 | 0.00 | 0.00 | 0.00 |
| 00003 GROSS RECEIPTS-VEH SCH ON FILE | AFV | 10/08/2014 | ALWM14011895 | PD | | | | | | |
| | C | 01/09/2015 | | | | | | | | |

|  |  | Claim No. ALWM14011895 | | | Total | 0.00 | 0.00 | 0.00 | 0.00 | 0.00 |

Losses for LOC: (41) STATE NATIONAL INSURANCE CO

| [41] VPA 0329982-00 | CA | 09/30/2014 | LOZANA    VANESSA | The inured vehicle stuck the o | | 0.00 | 80.00 | 0.00 | 0.00 | 80.00 |
| 00003 GROSS RECEIPTS-VEH SCH ON FILE | AFV | 10/03/2014 | ALWM14011668 | PD | | | | | | |
| | C | 08/22/2017 | | | | | | | | |

|  |  | Claim No. ALWM14011668 | | | Total | 0.00 | 80.00 | 0.00 | 0.00 | 80.00 |

Policy Level Loss non LOC                    Page 1 of 27

Reported by Meadowbrook Insurance Group Inc.

FIG. 4

| Policy Level Loss Detail Report No Loc | | | | | | | | | | | |
|---|---|---|---|---|---|---|---|---|---|---|---|

Program: CREST TRUCKING CONCEPTONE (WM) For policy VPA0329982

PROGRESSIVE TRANSPORTATION SER1360 W PACIFIC COAST HWY  LONG BEACH   CA90810    As of:

| [LOC] Policy Number | Acc State | Loss Date | Claimant Name | Accident Description | | | | | | | 03/18/2019 |
|---|---|---|---|---|---|---|---|---|---|---|---|
| [Unit#] Location Name | LOB | Report Date | Claim Number | Loss Cause | | | | Paid | Loss | Expense | Total |
| | Status | Close Date | | | | | Paid Loss | Paid Expense | Loss Reserve | Expense Reserve | Total Incurred |

Losses for Policy 0329982 Mod - [00] - 09/02/2014 to 08/01/2015

Losses for LOC [41] STATE NATIONAL INSURANCE CO

| [41] VPA0329982-00 | CA | 10/27/2014 | UNKNOWN | The insured vehicle collided w | 0.00 | 0.00 | 0.00 | 0.00 | 0.00 |
|---|---|---|---|---|---|---|---|---|---|
| 00001 HIRED AND NON-OWNED AUTO | AFV | 10/28/2014 | ALWM14012762 | PD | | | | | |
| | C | 01/20/2015 | | | | | | | |
| | | | Claim No. ALWM14012762 | Total | 0.00 | 0.00 | 0.00 | 0.00 | 0.00 |
| | | | Unit# 00001 | Total | 0.00 | 0.00 | 0.00 | 0.00 | 0.00 |

Losses for LOC [41] STATE NATIONAL INSURANCE CO

| [41] VPA0329982-00 | CA | 09/19/2014 | CHEUNG TONY | lane change caused accident | 0.00 | 0.00 | 0.00 | 0.00 | 0.00 |
|---|---|---|---|---|---|---|---|---|---|
| 00003 GROSS RECEIPTS-VEH SCH ON FILE | AFV | 10/08/2014 | ALWM14011895 | PD | | | | | |
| | C | 01/09/2015 | | | | | | | |
| [41] VPA0329982-00 | CA | 09/19/2014 | IRFAN KASHAF | lane change caused accident | 0.00 | 0.00 | 0.00 | 0.00 | 0.00 |
| 00003 GROSS RECEIPTS-VEH SCH ON FILE | AFV | 10/08/2014 | ALWM14011895 | PD | | | | | |
| | C | 01/09/2015 | | | | | | | |
| | | | Claim No. ALWM14011895 | Total | 0.00 | 0.00 | 0.00 | 0.00 | 0.00 |

Losses for LOC [41] STATE NATIONAL INSURANCE CO

| [41] VPA0329982-00 | CA | 09/30/2014 | LOZANA VANESSA | The insured vehicle stuck the o | 0.00 | 80.00 | 0.00 | 0.00 | 80.00 |
|---|---|---|---|---|---|---|---|---|---|
| 00003 GROSS RECEIPTS-VEH SCH ON FILE | AFV | 10/03/2014 | ALWM14011668 | PD | | | | | |
| | C | 08/22/2017 | | | | | | | |
| | | | Claim No. ALWM14011668 | Total | 0.00 | 80.00 | 0.00 | 0.00 | 80.00 |

Policy Level Loss non LOC              Page 1 of 27              Reported by Meadowbrook Insurance Group Inc.

```
[{'BlockType': 'LINE',
  'Confidence': 98.80813598632812,
  'Text': 'Policy Level Loss Detail Report No Loc',
  'Geometry': {'BoundingBox': {'Width': 0.36565467715263367,
     'Height': 0.03185732290148735,
     'Left': 0.30296480655670166,
     'Top': 0.03873414918780327},
   'Polygon': [{'X': 0.30296480655670166, 'Y': 0.03873414918780327},
     {'X': 0.6686194539070129, 'Y': 0.03873414918780327},
     {'X': 0.6686194539070129, 'Y': 0.07059147208929062},
     {'X': 0.30296480655670166, 'Y': 0.07059147208929062}]},
  'Id': '846cddc2-1436-46d7-824d-77142ab58ce2',
  'Relationships': [{'Type': 'CHILD',
    'Ids': ['7f046bf8-ffbf-46a0-b929-46dcf9934f01',
      '1644025c-ec3a-4b0a-bfa3-472e16bd6bbf',
      'e22c9d0e-b27c-4e8c-adec-d8349920ef14',
      '8960f70d-b3d2-4d99-bbf6-bfd3733904de',
      'f568197a-218a-49a6-8245-95e1407d2ea5',
      '96e0e129-5ef5-4782-b76b-c9b3ab30f8e7',
      'f5c70550-577d-4f61-bb0e-fc10ebb9f030']}]},
 {'BlockType': 'LINE',
  'Confidence': 99.89942169189453,
  'Text': 'Program: CREST TRUCKING CONCEPTONE (WM) For policy VPA0329982',
  'Geometry': {'BoundingBox': {'Width': 0.4131978452205658,
     'Height': 0.020725224167108536,
     'Left': 0.280814021825904,
     'Top': 0.0751866027712822},
   'Polygon': [{'X': 0.280814021825904, 'Y': 0.0751866027712822},
     {'X': 0.6940118670463562, 'Y': 0.0751866027712822},
     {'X': 0.6940118670463562, 'Y': 0.09591183066368103},
     {'X': 0.280814021825904, 'Y': 0.09591183066368103}]},
  'Id': '8c0946a8-3b06-4998-a16c-6d3f39a5eaa2',
  'Relationships': [{'Type': 'CHILD',
    'Ids': ['91367050-84ef-4019-953a-b02395996442',
      '16767795-515a-4551-94ff-883a3af11879',
      'e78ec906-e351-40c9-86f9-14bb70ef67c8',
      'fbab79c1-5dae-4c07-9d5a-fd24946ac19a',
      '24da76cf-9032-40cd-b511-d1968b2d2c35',
      '65a5f4bc-1319-41e1-9f9a-6b5b36d957fb',
      '2262d611-912c-41a4-96e0-bce2d0536962',
      '9224b503-82f2-4619-b3d3-c562299c2986']}]},
```

PHILADELPHIA
INSURANCE COMPANY
A Member of the Tokio Marine Group

Underwriting Loss Detail Report
(By Account/Policy Number/Loss Date)

Account: 5339          Puget Sound Regional Services

Policy: PHPK1495015      05/12/2016 _ 05/12/2017   Producer  Status: Primary
Claim: PHNP16071003990   Examiner: Cui  Date of Loss: 07/28/2016  Reported: 07/28/2016
Accident State: WA
Claim Description: GLASS LOSS. --VIN: 222292

Claimants:
001 PUGET SOUND REGIONAL SERVICES

| | Status Loss LC | Total Incurred |
|---|---|---|
| LOSS TYPE: COMP - GLASS | CL | 232.18 |
| Total for Claim: | 1 Claimants 1 Lines | 232.18 |

Claim: PHNP16121035580 Examiner: Amato Date of loss: 11/29/2016   Reported: 11/30/2016
Accident State: WA
Claim Description: Tow LOSS. --VIN: 232699

Claimants:
001 PUGET SOUND REGIONAL SERVICES

| | Status Loss LC | Total Incurred |
|---|---|---|
| LOSS TYPE: COMP - Other | CL | 100.00 |
| Total for Claim: | 1 Claimants 1 Lines | 100.00 |
| Total for Policy: | 2 Claims  1 Claimants 2 Lines | 332.18 |

Policy: PHPK11651757      05/12/2017 _ 05/12/2018   Producer  Status: Primary
There are no claims available for this policy post 01/01/1996.

Claimants:

| | Status Loss LC | Total Incurred |
|---|---|---|
| Total for Policy: | 0 Claims  0 Claimants 0 Lines | 0.00 |

Policy: PHPK1820138      05/12/2018 _ 05/12/2019   Producer  Status: Primary

Claim: PHNP18071188884 Examiner: Harmon  Date of loss: 06/14/2018  Reported: 07/05/2018
Accident State: WA
Claim Description: INSD received a report that IV had a dent VIN: 222292. 3 quotes done, and the lowest was $1900.06

Claimants:
001 Puget Sound Regional Services

| | Status Loss LC | Total Incurred |
|---|---|---|
| Loss Type: Collision | CL | 900.06 |
| Total for Claim: | 1 Claimants 1 Lines | 900.06 |

Date: February 19, 2021
Page: 1 of 6

A {

Opened: 07/29/2016    Closed: 08/09/2016

Reopened: 08/09/2016

| Total Reserves | Paid Loss | Paid Expense | Subro Salvage Recovered |
|---|---|---|---|
| 0.00 | 232.18 | 0.00 | 0.00 |
| 0.00 | 232.18 | 0.00 | 0.00 |

Opened: 12/01/2016    Closed: 12/02/2016

| Total Reserves | Paid Loss | Paid Expense | Subro Salvage Recovered |
|---|---|---|---|
| 0.00 | 100.00 | 0.00 | 0.00 |
| 0.00 | 100.00 | 0.00 | 0.00 |
| 0.00 | 332.18 | 0.00 | 0.00 |

| Total Reserves | Paid Loss | Paid Expense | Subro Salvage Recovered |
|---|---|---|---|
| 0.00 | 0.00 | 0.00 | 0.00 |

Opened: 07/05/2018    Closed: 07/10/2018

| Total Reserves | Paid Loss | Paid Expense | Subro Salvage Recovered |
|---|---|---|---|
| 0.00 | 900.06 | 0.00 | 0.00 |
| 0.00 | 900.06 | 0.00 | 0.00 |

FIG. 7B (Continued...)

Policy Level Loss Detail Report No Loc

Program: CREST TRUCKING CONCEPTONE (WM) For policy VPA0329982

PROGRESSIVE TRANSPORTATION SER1360 W PACIFIC COAST HWY   LONG BEACH   CA90810

As of: 03/18/2019

| [LOC] Policy Number [Unit#] Location Name | Acc State LOB Status | Loss Date Report Date Close Date | Claimant Name Claim Number | Loss Cause | Accident Description | Paid Loss | Paid Expense | Loss Reserve | Expense Reserve | Total Incurred |
|---|---|---|---|---|---|---|---|---|---|---|
| Losses for Policy 0329982, Mod-[00] - 09/02/2014 to 08/01/2015 | | | | | | | | | | |
| | | | Losses for LOC: (41) STATE NATIONAL INSURANCE CO | | | | | | | |
| [41] VPA 0329982-00 00001 HIRED AND NON-OWNED AUTO | CA AFV C | 10/27/2014 10/28/2014 01/20/2015 | UNKNOWN ALWM14012762 | PD | The insured vehicle collided w | 0.00 | 0.00 | 0.00 | 0.00 | 0.00 |
| | | | Claim No. ALWM14012762 Unit # 00001 | | Total | 0.00 | 0.00 | 0.00 | 0.00 | 0.00 |
| | | | | | Total | 0.00 | 0.00 | 0.00 | 0.00 | 0.00 |
| | | | Losses for LOC: (41) STATE NATIONAL INSURANCE CO | | | | | | | |
| [41] VPA 0329982-00 00003 GROSS RECEIPTS-VEH SCH ON FILE | CA AFV C | 09/19/2014 10/08/2014 01/09/2015 | CHEUNG TONY ALWM14011895 | PD | lane change caused accident | 0.00 | 0.00 | 0.00 | 0.00 | 0.00 |
| [41] VPA 0329982-00 00003 GROSS RECEIPTS-VEH SCH ON FILE | CA AFV C | 09/19/2014 10/08/2014 01/09/2015 | IRFAN KASHAF ALWM14011895 | PD | lane change caused accident | 0.00 | 0.00 | 0.00 | 0.00 | 0.00 |
| | | | Claim No. ALWM14011895 | | Total | 0.00 | 0.00 | 0.00 | 0.00 | 0.00 |
| | | | Losses for LOC: (41) STATE NATIONAL INSURANCE CO | | | | | | | |
| [41] VPA 0329982-00 00003 GROSS RECEIPTS-VEH SCH ON FILE | CA AFV C | 09/30/2014 10/03/2014 08/22/2017 | LOZANA VANESSA ALWM14011668 | PD | The inured vehicle stuck the o | 0.00 | 80.00 | 0.00 | 0.00 | 80.00 |
| | | | Claim No. ALWM14011668 | | Total | 0.00 | 80.00 | 0.00 | 0.00 | 80.00 |

Policy Level Loss non LOC

Page 1 of 27

Reported by Meadowbrook Insurance Group Inc.

FIG. 8

Policy Level Loss Detail Report No Loc

Program: CREST TRUCKING CONCEPTONE (WM) For policy VPA0329982

PROGRESSIVE TRANSPORTATION SER1360 W PACIFIC COAST HWY   LONG BEACH   CA90810

As of: 03/18/2019

[LOC] Policy Number   Acc State   Loss Date   Claimant Name   Accident Description

[Unit#] Location Name   LOB   Report Date   Claim Number   Loss Cause

Status   Close Date

| | Paid Loss | Paid Expense | Loss Reserve | Expense Reserve | Total Incurred |
|---|---|---|---|---|---|

36a   Losses for Policy 0329982, Mod – [08] - 09/02/2014 to 08/01/2015

36c   Losses for LOC: (41) STATE NATIONAL INSURANCE CO

| [41] VPA 0329982-00 | CA | 10/27/2014 | UNKNOWN | The insured vehicle collided w | | | | | |
|---|---|---|---|---|---|---|---|---|---|
| 00001 HIRED AND NON-OWNED/AUTO | AFV | 10/28/2014 | ALWM14012762 | PD | 0.00 | 0.00 | 0.00 | 0.00 | 0.00 |
| | C | 01/20/2015 | | | 0.00 | 0.00 | 0.00 | 0.00 | 0.00 |

36b   Claim No. ALWM14012762

Unit # 00001    Total   0.00   0.00   0.00   0.00   0.00

Total   0.00   0.00   0.00   0.00   0.00

| [41] VPA 0329982-00 | CA | 09/19/2014 | CHEUNG TONY | lane change caused accident | | | | | |
|---|---|---|---|---|---|---|---|---|---|
| 00003 GROSS RECEIPTS-VEH SCH ON FILE | AFV | 10/08/2014 | ALWM14011895 | PD | 0.00 | 0.00 | 0.00 | 0.00 | 0.00 |
| | C | 01/09/2015 | | | | | | | |

| [41] VPA 0329982-00 | CA | 09/19/2014 | IRFAN KASHAF | lane change caused accident | | | | | |
|---|---|---|---|---|---|---|---|---|---|
| 00003 GROSS RECEIPTS-VEH SCH ON FILE | AFV | 10/08/2014 | ALWM14011895 | PD | 0.00 | 0.00 | 0.00 | 0.00 | 0.00 |
| | C | 01/09/2015 | | | | | | | |

Claim No. ALWM14011895

Losses for LOC: (41) STATE NATIONAL INSURANCE CO    Total   0.00   0.00   0.00   0.00   0.00

| [41] VPA 0329982-00 | CA | 09/30/2014 | LOZANA VANESSA | The inured vehicle stuck the o | | | | | |
|---|---|---|---|---|---|---|---|---|---|
| 00003 GROSS RECEIPTS-VEH SCH ON FILE | AFV | 10/03/2014 | ALWM14011668 | PD | 0.00 | 80.00 | 0.00 | 0.00 | 80.00 |
| | C | 08/22/2017 | | | | | | | |

Claim No. ALWM14011668    Total   0.00   80.00   0.00   0.00   80.00

Policy Level Loss non LOC      Page 1 of 27      Reported by Meadowbrook Insurance Group Inc.

Policy Level Loss Detail Report No Loc

Program: CREST TRUCKING CONCEPTONE (WM) For policy VPA0329982    LONG BEACH    CA90810

PROGRESSIVE TRANSPORTATION SER1360 W PACIFIC COAST HWY

As of: 03/18/2019

| [LOC] Policy Number [Unit#] Location Name | Acc State LOB Status | Loss Date Report Date Close Date | Claimant Name | Claim Number | Loss Cause | Paid Loss | Paid Expense | Loss Reserve | Expense Reserve | Total Incurred |
|---|---|---|---|---|---|---|---|---|---|---|

Losses for Policy 0329982, Mod - [00] - 09/02/2014 to 08/01/2015
Losses for LOC: (41) STATE NATIONAL INSURANCE CO

| [41] VPA 0329982-00 | CA | 10/27/2014 | UNKNOWN | ALWM14012762 | PD | | | | 0.00 | 0.00 |
| 00001 HIRED AND NON-OWNED AUTO | AFV | 10/28/2014 | | | | | | | | |
| | C | 01/20/2015 | | | | | | | 0.00 | 0.00 |

Claim No. ALWM14012762
Unit # 00001
Losses for LOC: (41) STATE NATIONAL

The insured vehicle collided w — 37a

- ○ Date
- ○ $ Amount
- ● Text
- ○ US State

| Total | | | | | | 0.00 | 0.00 | 0.00 | 0.00 | 0.00 |
| Total | | | | | | 0.00 | 0.00 | 0.00 | 0.00 | 0.00 |

| [41] VPA 0329982-00 | CA | 09/19/2014 | CHEUNG   TONY | ALWM14011895 | PD | 0.00 | 0.00 | 0.00 | 0.00 | 0.00 |
| 00003 GROSS RECEIPTS-VEH SCH ON FILE | AFV | 10/08/2014 | | | | | | | | |
| | C | 01/09/2015 | | | | | | | | |

| [41] VPA 0329982-00 | CA | 09/19/2014 | IRFAN   KASHAF | ALWM14011895 | PD | 0.00 | 0.00 | 0.00 | 0.00 | 0.00 |
| 00003 GROSS RECEIPTS-VEH SCH ON FILE | AFV | 10/08/2014 | | | | | | | | |
| | C | 01/09/2015 | | | | | | | | | lane change caused accident

Claim No. ALWM14011895
Losses for LOC: (41) STATE NATIONAL INSURANCE CO

| Total | | | | | | 0.00 | 0.00 | 0.00 | 0.00 | 0.00 |

| [41] VPA 0329982-00 | CA | 09/30/2014 | LOZANA   VANESSA | ALWM14011668 | PD | 0.00 | 80.00 | 0.00 | 0.00 | 80.00 |
| 00003 GROSS RECEIPTS-VEH SCH ON FILE | AFV | 10/03/2014 | | | | | | | | |
| | C | 08/22/2017 | | | | | | | | |

The insured vehicle stuck the o

Claim No. ALWM14011668

| Total | | | | | | 0.00 | 80.00 | 0.00 | 0.00 | 80.00 |

Policy Level Loss non LOC 36a    36b    35    36c    33(1)

Reported by Meadowbrook Insurance Group Inc.

FIG. 10

Policy Level Loss Detail Report No Loc

Program: CREST TRUCKING CONCEPTONE (WM) For policy VPA0329982

PROGRESSIVE TRANSPORTATION SER1360 W PACIFIC COAST HWY    LONG BEACH    CA90810

As of: 03/18/2019

| [LOC] Policy Number | Acc State | LOB | Loss Date | Claimant Name | Claim Number | | | | | | Accident Description | | | |
|---|---|---|---|---|---|---|---|---|---|---|---|---|---|---|
| [Unit#] Location Name | | | Report Date | | | | Loss Cause | Paid Loss | Paid Expense | Loss Reserve | Expense Reserve | Loss Reserve | Expense Reserve | Total Incurred |
| | | | Status | Close Date | | | | | | | | | | |

Losses for Policy 0329982, Mod - [00] - 09/02/2014 to 08/01/2015

Losses for LOC: (41) STATE NATIONAL INSURANCE CO

| | | | | | | | | | | | | | |
|---|---|---|---|---|---|---|---|---|---|---|---|---|---|
| [41] VPA 0329982-00 | CA | | 10/27/2014 | UNKNOWN | | | | 0.00 | 0.00 | 0.00 | 0.00 | 0.00 | 0.00 |
| 00001 HIRED AND NON-OWNED AUTO | | AFV | 10/28/2014 | ALWM14012762 | | PD | | | | | | | |
| | | C | 01/20/2015 | | | | | | | | | | |

The insured vehicle collided w ⌐37b

Claim No. ALWM14012762     Unit # 00001

Losses for LOC: (41) STATE NATIONAL

Total   0.00   0.00   0.00   0.00   0.00   0.00
Total   0.00   0.00   0.00   0.00   0.00   0.00

○ Loss Date
○ Amount Paid
● Description
○ Claimant Name

| | | | | | | | | | | | | | |
|---|---|---|---|---|---|---|---|---|---|---|---|---|---|
| [41] VPA 0329982-00 | CA | | 09/19/2014 | CHEUNG   TONY | | | | 0.00 | 0.00 | 0.00 | 0.00 | 0.00 | 0.00 |
| 00003 GROSS RECEIPTS-VEH SCH ON FILE | | AFV | 10/08/2014 | ALWM14011895 | | PD | | | | | | | |
| | | C | 01/09/2015 | | | | | | | | | | |
| [41] VPA 0329982-00 | CA | | 09/19/2014 | IRFAN   KASHAF | | | lane change caused accident | 0.00 | 0.00 | 0.00 | 0.00 | 0.00 | 0.00 |
| 00003 GROSS RECEIPTS-VEH SCH ON FILE | | AFV | 10/08/2014 | ALWM14011895 | | PD | | | | | | | |
| | | C | 01/09/2015 | | | | | | | | | | |

Claim No. ALWM14011895

Losses for LOC: (41) STATE NATIONAL INSURANCE CO

Total   0.00   0.00   0.00   0.00   0.00   0.00

| | | | | | | | | | | | | | |
|---|---|---|---|---|---|---|---|---|---|---|---|---|---|
| [41] VPA 0329982-00 | CA | | 09/30/2014 | LOZANA   VANESSA | | | The insured vehicle stuck the o | 0.00 | 0.00 | 0.00 | 0.00 | 0.00 | 80.00 |
| 00003 GROSS RECEIPTS-VEH SCH ON FILE | | AFV | 10/03/2014 | ALWM14011668 | | PD | | | 80.00 | | | | |
| | | C | 08/22/2017 | | | | | | | | | | |

Claim No. ALWM14011668

Total   0.00   80.00   0.00   0.00   0.00   80.00

Policy Level Loss non LOC

33(1)   33(2)   33(3)

Page 1 of 27

Reported by Meadowbrook Insurance Group Inc.

FIG. 11

Policy Level Loss Detail Report No Loc

As of: 03/18/2019

Program: CREST TRUCKING CONCEPT ONE (WM) For policy VPA0329982

PROGRESSIVE TRANSPORTATION SER1360 W PACIFIC COAST HWY LONG BEACH   CA90810

| [LOC] Policy Number | Acc State | Loss Date | Claimant Name | | | Paid Loss | Paid Expense | Loss Reserve | Expense Reserve | Total Incurred |
|---|---|---|---|---|---|---|---|---|---|---|
| [Unit#] Location Name | LOB | Report Date | Claim Number | Accident Description | | | | | | |
| | Status | Close Date | | Loss Cause | | | | | | |

Losses for Policy 0329982 Mod - [00] - 09/02/2014 to 08/01/2015

Losses for LOC [41] STATE NATIONAL INSURANCE CO

| [41] VPA0329982-00 | CA | 10/27/2014 | UNKNOWN | | | 0.00 | 0.00 | 0.00 | 0.00 | 0.00 |
| 00001 HIRED AND NON H OWNED AUTO | AFV | 10/28/2014 | ALWM14012762 | The insured vehicle collided w | | | | | | |
| | C | 01/20/2015 | | PD | | | | | | |

Claim No. ALWM14012762   Unit# 00001   Total   0.00 0.00 0.00 0.00 0.00

Losses for LOC [41] STATE NATIONAL INSURANCE CO   Total   0.00 0.00 0.00 0.00 0.00

| [41] VPA0329982-00 | CA | 09/19/2014 | CHEUNG TONY | | | 0.00 | 0.00 | 0.00 | 0.00 | 0.00 |
| 00003 GROSS RECEIPTS-VEH SCH ON FILE | AFV | 10/08/2014 | ALWM14011895 | lane change caused accident | | | | | | |
| | C | 01/09/2015 | | PD | | | | | | |

| [41] VPA0329982-00 | CA | 09/19/2014 | IRFAN KASHAE | | | 0.00 | 0.00 | 0.00 | 0.00 | 0.00 |
| 00003 GROSS RECEIPTS-VEH SCH ON FILE | AFV | 10/08/2014 | ALWM14011895 | lane change caused accident | | | | | | |
| | C | 01/09/2015 | | PD | | | | | | |

Claim No. ALWM14011895   Losses for LOC [41] STATE NATIONAL INSURANCE CO   Total   0.00 0.00 0.00 0.00 0.00

| [41] VPA0329982-00 | CA | 09/30/2014 | LOZANA VANESSA | | | 0.00 | 80.00 | 0.00 | 0.00 | 80.00 |
| 00003 GROSS RECEIPTS-VEH SCH ON FILE | AFV | 10/03/2014 | ALWM14011668 | The insured vehicle stuck the g | | | | | | |
| | C | 08/22/2017 | | PD | | | | | | |

Claim No. ALWM14011668   Total   0.00 80.00 0.00 0.00 80.00

Policy Level Loss from LOC

Page 1 of 27

Reported by Meadowbrook Insurance Group Inc.

FIG. 12

| | col_0 | col_1 | col_2 | col_3 | col_4 | col_5 | col_6 | col_7 | col_8 | col_9 | col_10 |
|---|---|---|---|---|---|---|---|---|---|---|---|
| 0 | | | Policy Level Loss | | Detail Report No | Loc | | | | | |
| 1 | | | | Program: | CREST CONCEPTONE TRUCKING | (WM) For policy VPA0329982 | | | | | |
| 2 | | PROGRESSIVE TRANSPO-RTATION | | SER1360 W PACIFIC | COAST HWY LONG BEACH | CA90810 | | | | | As of: |
| 3 | | [LOC] Policy Number | Acc Loss Date | Claimant Name | Accident Description | | | | | 03/18/2019 | |
| 4 | | State | | | | | | | | | |
| 5 | | [Unit#] Location Name | LOB Report | Claim Number | Loss | | | | | | |
| 6 | | | Date | Cause | | | | | | | |
| 7 | | Status | Close Date | | | | Paid Loss | Paid Expense | Loss Reserve | Expense Reserve | Total Incurred |
| 8 | | | | | | | Loss | | | | |
| 9 | | | Losses for 0329982, Mod to 08/01/2015 Policy (00)-09/02/2014 | | | | | | | | |
| 10 | | | Losses for LOC (41) STATE NATIONAL | | INSURANCE CO | | | | | | |
| 11 | | [41] VPA 0329982-00 | CA 10/27/2014 UNKNOWN | | The insured vehicle collided w | | 0.00 | 0.00 | 0.00 | 0.00 | |
| 12 | | 00001 HIRED AND NON- | AFV 10/28/2014 ALWM14012762 | | PD | | | | | | |
| 13 | | OWNED AUTO | | | | | | | | | |
| 14 | | | C 01/20/2015 | | | | | | | | |
| 15 | | | Claim No. ALWM14012762 | | Total | | 0.00 | 0.00 | 0.00 | 0.00 | |

| Acc State | Accident Description | Claim Number | Claimant Name | Close Date | Expense Reserve | LOB | Loss Cause | Loss Date | Loss Reserve | Paid Expense | Paid Loss | Report Date | Status | Total Incurred |
|---|---|---|---|---|---|---|---|---|---|---|---|---|---|---|
| 0 | CA | The insured vehicle collided w | ALWM14012762 | UNKNOWN | 01/20/2015 | 0.00 | AFV | PD | 10/27/2014 | 0.00 | 0.00 | 0.00 | 10/28/2014 | C | 0.00 |
| 1 | CA | lane change caused accident | ALWM14011895 | CHEUNG TONY | 01/09/2015 | 0.00 | AFV | PD | 09/19/2014 | 0.00 | 0.00 | 0.00 | 10/08/2014 | C | 0.00 |
| 2 | CA | lane change caused accident | ALWM14011895 | IRFAN KASHAF | 01/09/2015 | 0.00 | AFV | PD | 09/19/2014 | 0.00 | 0.00 | 0.00 | 10/08/2014 | C | 0.00 |
| 3 | CA | The insured vehicle stuck the 0 | ALWM14011668 | LOZANA VANESSA | 08/22/2017 | 0.00 | AFV | PD | 09/30/2014 | 0.00 | 80.00 | 0.00 | 10/03/2014 | C | 80.00 |

Fig. 15

| | Claim # | Claimant Name | Loss Description | Open Date | Loss Date | Close Date | Status | Total |
|---|---|---|---|---|---|---|---|---|
| 33(1) | ALWM14012762 | UNKNOWN | The insured vehicle collided w | 10/28/2014 | 10/27/2014 | 01/20/2015 | C | 0.00 |
| 33(2) | ALWM14011895 | CHEUNG TONY | lane change caused accident | 10/08/2014 | 09/19/2014 | 01/09/2015 | C | 0.00 |
| 33(3) | ALWM14011895 | IRFAN KASHAF | lane change caused accident | 10/08/2014 | 09/19/2014 | 01/09/2015 | C | 0.00 |
| 33(4) | ALWM14011668 | LOZANA VANESSA | The inured vehicle stuck the 0 | 10/03/2014 | 09/30/2014 | 08/22/2017 | C | 80.00 |

Fig. 16

```
Forms.TRAVELLERS: [
    [re_not_empty, re_number, re_any, re_not_empty, re_date, re_date, re_date_or_empty, re_any, re_any, None, None],
    [re_any, re_any, re_any, re_any, re_any, re_any, re_any, "Inc", re_dol, re_dol, re_dol, re_dol],
    [re_any, re_any, re_any, re_any, re_any, re_any, re_any, "Mrt", re_dol, re_dol, re_dol, re_dol],
    [re_any, re_any, re_any, re_any, re_any, re_any, re_any, "US?", re_dol, re_dol, re_dol, re_dol]
];
```

Fig. 17B

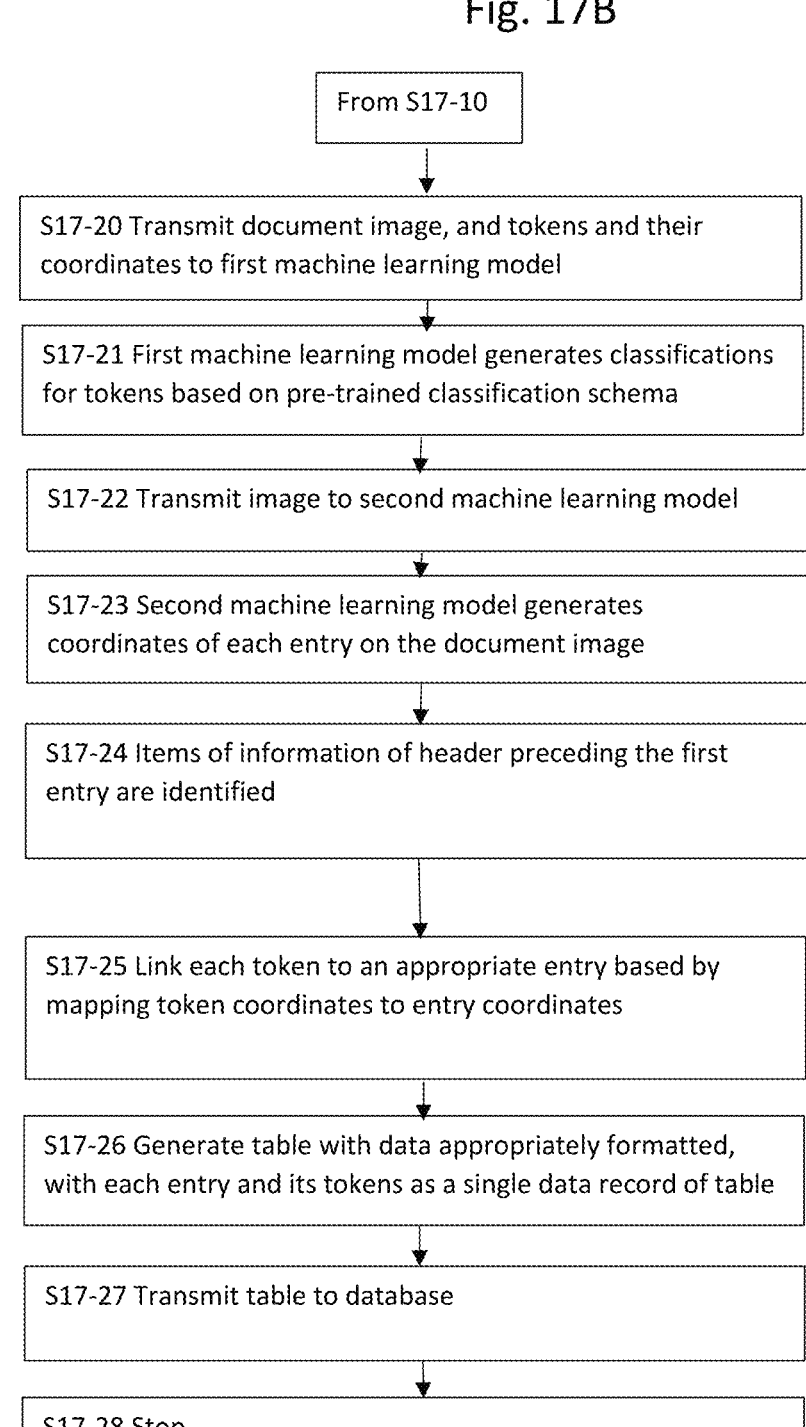

From S17-10

S17-20 Transmit document image, and tokens and their coordinates to first machine learning model S17-21 First machine learning model generates classifications for tokens based on pre-trained classification schema S17-22 Transmit image to second machine learning model S17-23 Second machine learning model generates coordinates of each entry on the document image S17-24 Items of information of header preceding the first entry are identified S17-25 Link each token to an appropriate entry based by mapping token coordinates to entry coordinates S17-26 Generate table with data appropriately formatted, with each entry and its tokens as a single data record of table S17-27 Transmit table to database S17-28 Stop

Fig. 20

Insurer: Ferguson LLC

Consumer Loss Run for Montgomery Inc from 2009-12-20 to 2010-07-11

Policy Number: LCQW1M

Eff Date: 2009-10-26

Line of Business: Party group close thank international several.

| DOI | Description | Status | Claimant | Notice Date | Claim | Loss / Paid to date | Loss / O/S | Expense / Paid to date | Expense / O/S |
|---|---|---|---|---|---|---|---|---|---|
| 2009-12-28 | Mouth middle front mention. Deep learn surface. Store size through for although player five. Street prove establish single trouble door surface. | Closed | Braeden Tucker | 2010-01-08 | JKUDTNKMD | 8,718.99 | 8,055.32 | 8,686.66 | 718.33 |
| Resolved Date | 2010-02-04 | | | | | | | | |
| 2010-01-14 | Team parent citizen side economic. Certainly meeting author his generation. Someone scientist draw rock scientist. | O | Lisa Haley | 2010-01-28 | K1RRU7L08 | 8,298.68 | 2,488.99 | (801.25) | 7,019.37 |
| Resolved Date | 2010-02-28 | | | | | | | | |
| 2010-02-01 | Medical change I Democrat us debate. Price garden president always. Form type man election free walk. | C | Timothy Wagner | 2010-02-14 | J8QPA8CY8 | 7,604.42 | 3,417.68 | 3,368.57 | 10,048.95 |
| Resolved Date | 2010-03-17 | | | | | | | | |

Fig. 21A

ExampleInputs( 81 tokens=['Consumer', 'Loss', 'Run', 'for', 'Montgomery', 'Inc', 'from', 'Insurer:', 'Ferguson', 'LLC',
'2009-12-20', 'to', '2010-07-11', 'Policy', 'Number:', 'LCQW1M', 'Eff', 'Date:', '2009-10-26', 'Line', 'of',
'Business:', 'Party', 'group', 'close', 'thank', 'international', 'several.', 'Loss', '/', 'Notice', 'DOI',
'Description', 'Status', 'Claimant', 'Claim', 'Paid', 'to', 'Loss', '/', 'Expense', '/', 'Paid', 'to', 'Expense', '/',
'Date', 'O/S', 'O/S', 'date', 'date', 'Mouth', 'middle', 'front', 'mention.', 'Deep', 'learn', 'surface.', 'Store',
'she', 'through', 'Brandon', '2009-12-28', 'for', 'although', 'player', 'five.', 'Street', 'Closed', '2010-01-08',
'JKUDTNKMD', 'Tucker', '8,718.59', '8,055.32', '6,686.66', '718.33', 'prove', 'establish', 'single',
'trouble', 'door', 'surface.', 'Resolved', '2010-02-04', 'Date', 'Team', 'parent', 'citizen', 'side', 'economic.',
'2010-01-14', 'Certainly', 'meeting', 'author', 'his', 'O', 'Lisa', 'Haley', '2010-01-28', 'KLRRU7LO8',
'6,298.68', '2,448.99', 'generation.', 'Someone', 'scientist', '(801.25)', '7,019.37', 'draw', 'rock',
'scientist.', 'Resolved', '2010-02-28', 'Date', 'Medical', 'change', 'I', 'Democrat', 'us', '2010-02-01',
'debate.', 'Price', 'garden', 'president', 'C', 'Timothy', '2010-02-14', 'always.', 'Form', 'type', 'man',
'election', 'JGQPA8CY5', '7,604.42', '3,417.68', '3,568.57', '10,048.95', 'Wagner', 'free', 'walk.',
'Resolved', '2010-03-17', 'Date', 'Page', 'Number:', '32'], 82 bboxes=[[509, 60, 590, 75], [594, 60, 630, 76], [635, 60, 666, 76], [671, 60, 694, 76], [698,
60, 798, 79], [803, 61, 830, 75], [834, 60, 871, 76], [51, 71, 116, 87], [122, 71, 195, 90], [201, 71,
230, 87], [510, 83, 604, 98], [609, 83, 626, 98], [631, 82, 726, 98], [52, 128, 98, 148], [103, 128, 173,
145], [178, 129, 249, 148], [52, 175, 73, 191], [77, 175, 118, 191], [125, 175, 220, 191], [52, 222, 86,
238], [90, 222, 106, 238], [110, 222, 186, 238], [191, 222, 233, 241], [238, 226, 285, 241], [290, 222,
332, 238], [335, 222, 383, 238], [51, 244, 154, 260], [159, 244, 221, 260], [654, 333, 681, 347], [685,
333, 691, 348], [483, 342, 522, 355], [52, 350, 75, 363], [138, 350, 208, 366], [346, 350, 386, 363],
[403, 350, 458, 363], [565, 350, 600, 363], [654, 350, 680, 363], [683, 351, 696, 363], [731, 342, 759,
355], [762, 342, 769, 357], [801, 334, 852, 349], [857, 333, 863, 348], [801, 350, 827, 363], [830,
351, 843, 364], [887, 342, 938, 357], [942, 342, 949, 357], [483, 359, 511, 372], [730, 359, 756, 373],
[886, 359, 911, 373], [653, 368, 681, 380], [800, 368, 828, 380], [138, 412, 172, 425], [175, 412, 211,
425], [215, 412, 241, 425], [244, 413, 291, 425], [295, 413, 323, 427], [139, 429, 166, 442], [170,
429, 211, 442], [217, 429, 246, 442], [250, 429, 269, 442], [272, 429, 314, 445], [404, 438, 449, 451],
[53, 447, 115, 459], [138, 446, 154, 459], [157, 446, 204, 462], [208, 446, 241, 462], [245, 446, 268,
459], [272, 446, 307, 459], [346, 446, 382, 459], [483, 446, 545, 459], [564, 446, 634, 459], [404,
454, 440, 467], [653, 446, 701, 461], [731, 446, 778, 461], [800, 446, 848, 461], [886, 447, 923, 459],
[139, 466, 169, 479], [173, 463, 221, 476], [224, 463, 256, 479], [259, 463, 297, 476], [301, 463, 325,
476], [138, 480, 181, 493], [53, 521, 108, 534], [138, 530, 201, 542], [53, 539, 81, 551], [138, 583,
166, 596], [171, 584, 206, 598], [209, 584, 243, 596], [247, 583, 269, 596], [272, 584, 327, 596], [53,
609, 114, 622], [138, 600, 186, 616], [190, 601, 233, 616], [237, 600, 273, 613], [277, 600, 292, 613],
[346, 609, 355, 622], [404, 609, 424, 622], [429, 609, 460, 625], [483, 609, 544, 622], [565, 609, 629,
622], [653, 609, 700, 624], [731, 609, 779, 624], [137, 618, 199, 633], [203, 618, 254, 630], [258,
618, 303, 630], [801, 609, 846, 625], [886, 609, 934, 624], [138, 635, 165, 647], [169, 635, 193, 647],
[196, 635, 242, 647], [53, 676, 108, 688], [138, 684, 201, 696], [53, 693, 81, 705], [138, 738, 178,
750], [183, 737, 221, 753], [225, 738, 230, 750], [234, 738, 287, 750], [290, 740, 303, 750], [53, 763,
115, 776], [138, 754, 178, 767], [183, 755, 209, 767], [212, 755, 251, 770], [255, 755, 305, 769],
[347, 763, 355, 776], [403, 754, 447, 770], [483, 763, 544, 776], [138, 771, 178, 787], [183, 772, 210,
784], [213, 773, 238, 787], [241, 774, 265, 784], [268, 771, 310, 784], [565, 763, 629, 778], [653, 763, 700, 778], [731, 763, 778, 778], [800, 763, 848, 778], [887, 763, 941, 778], [404, 772, 446, 787], [138, 788, 160, 801], [163, 788, 192, 802], [53, 829, 109, 842], [138, 839, 201, 851], [53, 847, 81, 859], [353, 958, 387, 976], [392, 958, 452, 972], [457, 958, 475, 972]].

```
        image=array([[[255, 255, 255],
    [255, 255, 255],
    [255, 255, 255],                              ←——— 82
    ...,
    [255, 255, 255],
    [255, 255, 255],
    [255, 255, 255]],

```
        [255, 255, 255],
        [255, 255, 255],                    ◄------------  83
        ...,
        [255, 255, 255],
        [255, 255, 255],
        [255, 255, 265]]], dtype=uint8
), image_path=", ner_tags=None)
```

Fig. 22

['B-Line of Business',
 'O',
 'O',
 'O',
 'O',
 'B-Policyholder Name',
 'I-Policyholder Name',
 'O',
 'B-Line of Business',
 'I-Line of Business',
 'I-Line of Business',
 'O',
 'O',
 'B-Loss Run Start Date',
 'B-Loss Run Start Date',
 'B-Loss Run Start Date',
 'B-Loss Run Start Date',
 'O',
 'O',
 'B-Loss Run End Date', ...
 'I-Claimant Name',
 'I-Loss Description',
 'I-Loss Description',
 'I-Loss Description',
 'B-Status',
 'B-Close Date',
 'B-Close Date',
 'B-Close Date', 'B-Close Date',
 'B-Close Date',
 'B-Status',
 'B-Line of Business',
 'I-Line of Business',
 'I-Line of Business',
 'O',
 'B-Line of Business']

Fig. 23

Page Level

| LOSS_RUN_END_D... | 4/16/2019 |
|---|---|
| POLICYHOLDER_NA... | Progressive Transportation Services, LLC |
| POLICY_NUMBER | CA0229962-04 |
| LINE_OF_BUSINESS | CommAuto |

Claim Level

| | CLAIM_NUMB... | CLAIMANT_NAME | LOSS_DATE | STATUS | CLOSE_DATE | | LOSS_DESCRIPTION |
|---|---|---|---|---|---|---|---|
| 0 | 12412AL00147 | Aileen Hu Xai Du | 01/04/2012 | Closed | 02/16/2012 | 12/06/2012 | IV struck CV while m |
| 1 | 12412AL00158 | Victor Arriola | 02/13/2012 | Closed | 02/17/2012 | 05/16/2012 | IV trlr struck OV whil |
| 2 | 12412AL00175 | Crystal Catherine Hernal | 02/16/2012 | Closed | 03/05/2012 | 07/17/2014 | IV rearended CV |
| 3 | 12412AL00175 | Crystal Catherine Hernal | 02/16/2012 | Closed | 03/05/2012 | 07/17/2014 | IV rearended CV |
| 4 | 12412AL00175 | Crystal Catherine Hernal | 02/16/2012 | Closed | 03/05/2012 | 07/17/2014 | IV rearended CV |
| 5 | 12412AL00293 | <NA> | <NA> | <NA> | <NA> | | <NA> |

Policy Level Loss Detail Report No Loc

Program: CREST TRUCKING CONCEPTONE (WM) For policy VPA0329982  CA90810
PROGRESSIVE TRANSPORTATION SER1360 W PACIFIC COAST HWY  LONG BEACH
As of: 03/18/2019

| [LOC] Policy Number [Unit#] Location Name | Acc State LOB | Loss Date Report Date Close Date | Status | Claimant Name Claim Number | Loss Cause | Accident Description | Paid Loss | Paid Expense | Loss Reserve | Expense Reserve | Total Incurred |
|---|---|---|---|---|---|---|---|---|---|---|---|
| Losses for Policy 0329982, Mod = [00] - 08/01/2015 to 08/01/2016 | | | | | | | | | | | |
| *Losses for LOC: (41) STATE NATIONAL INSURANCE CO* | | | | | | | | | | | |
| [41] VPA 0329982-01 00001 HIRED AND NON-OWNED AUTO | CA AFV | 03/17/2016 03/17/2016 | O | LOPEZ DIANA ALWM16002183 | BI | Per insured, other party tried | 0.00 | 1,235.00 | 22,501.00 | 0.00 | 23,736.00 |
| [41] VPA 0329982-01 00001 HIRED AND NON-OWNED AUTO | CA AFV | 03/17/2016 03/21/2016 10/05/2016 | C | LOPEZ DIANA ALWM16002183 | PD | Per insured, other party tried | 8,174.01 | 0.00 | 0.00 | 0.00 | 8,174.01 |
| Claim No. ALWM16002183 | | | | Total | | | 8,174.01 | 1,235.00 | 22,501.00 | 0.00 | 31,910.01 |
| Unit # 00001 | | | | Total | | | 8,174.01 | 1,235.00 | 22,501.00 | 0.00 | 31,910.01 |
| *Losses for LOC: (41) STATE NATIONAL INSURANCE CO* | | | | | | | | | | | |
| [41] VPA 0329982-01 00003 GROSS RECEIPTS-VEH SCH ON FILE | CA AFV | 08/14/2015 08/14/2015 11/03/2015 | C | UNKNOWN CLAIMAN T ALWM15008030 | PD | Insured was struck by another | 0.00 | 0.00 | 0.00 | 0.00 | 0.00 |
| Claim No. ALWM15008030 | | | | Total | | | 0.00 | 0.00 | 0.00 | 0.00 | 0.00 |
| *Losses for LOC: (41) STATE NATIONAL INSURANCE CO* | | | | | | | | | | | |
| [41] VPA 0329982-01 00003 GROSS RECEIPTS-VEH SCH ON FILE | CA AFV | 09/16/2015 05/09/2016 09/14/2016 | C | ANTONINI BROTHE RS ALWM16003686 | PD | Both vehicles making a left ha | 0.00 | 0.00 | 0.00 | 0.00 | 0.00 |
| Claim No. ALWM16003686 | | | | Total | | | 0.00 | 0.00 | 0.00 | 0.00 | 0.00 |

2610

2620

```
"row_schema" : [
[ "not_empty", "any", "date", "not_start_with(Losses for LOC)", null, "any", "number", "any", "any", "any" ],
[ "not_empty", "any", "any", "any", null, null, null, null, null, null ],
[ null, "any", "any", "any", null, null, null, null, null, null ]
]
```

FIG. 26A

Policy Level Loss Detail Report No Loc

Program: CREST TRUCKING CONCEPTONE (WM) For policy VPA0329982

PROGRESSIVE TRANSPORTATION SER1360 W PACIFIC COAST HWY   LONG BEACH   CA90810

As of: 03/18/2019

| [LOC] Policy Number / [Unit#] Location Name | Acc State | Loss Date | Report Date | Close Date | LOB Status | Claim Number | Claimant Name | Loss Cause | Accident Description | Paid Loss | Paid Expense | Loss Reserve | Expense Reserve | Total Incurred |
|---|---|---|---|---|---|---|---|---|---|---|---|---|---|---|
| Losses for Policy 0329982, Mod - [00] - 08/01/2015 to 08/01/2016 | | | | | | | | | | | | | | |
| Losses for LOC: (41) STATE NATIONAL INSURANCE CO | | | | | | | | | | | | | | |
| [41] VPA 0329982-01 / 00001 HIRED AND NON-OWNED AUTO | CA | 03/17/2016 | 03/21/2016 | | AFV / O | ALWM16002183 | LOPEZ DIANA | BI | Per insured, other party tried | 0.00 | 0.00 | 1,235.00 | 22,501.00 | 23,736.00 |
| [41] VPA 0329982-01 / 00001 HIRED AND NON-OWNED AUTO | CA | 03/17/2016 | 03/21/2016 | 10/05/2016 | AFV / C | ALWM16002183 | LOPEZ DIANA | PD | Per insured, other party tried | 8,174.01 | 8,174.01 | 0.00 | 0.00 | 8,174.01 |
| Claim No. ALWM16002183 | | | | | | | | | Total | 8,174.01 | 1,235.00 | 22,501.00 | 0.00 | 31,910.01 |
| Unit # 00001 | | | | | | | | | Total | 8,174.01 | 1,235.00 | 22,501.00 | 0.00 | 31,910.01 |
| Losses for LOC: (41) STATE NATIONAL INSURANCE CO | | | | | | | | | | | | | | |
| [41] VPA 0329982-01 / 00003 GROSS RECEIPTS-VEH SCH ON FILE | CA | 08/14/2015 | 08/14/2015 | 11/03/2015 | AFV / C | ALWM15008030 | UNKNOWN CLAIMAN T | PD | Insured was struck by another | 0.00 | 0.00 | 0.00 | 0.00 | 0.00 |
| Claim No. ALWM15008030 | | | | | | | | | Total | 0.00 | 0.00 | 0.00 | 0.00 | 0.00 |
| Losses for LOC: (41) STATE NATIONAL INSURANCE CO | | | | | | | | | | | | | | |
| [41] VPA 0329982-01 / 00003 GROSS RECEIPTS-VEH SCH ON FILE | CA | 09/16/2015 | 05/09/2016 | 09/14/2016 | AFV / C | ALWM16003686 | ANTONINI BROTHE RS | PD | Both vehicles making a left ha | 0.00 | 0.00 | 0.00 | 0.00 | 0.00 |
| Claim No. ALWM16003686 | | | | | | | | | Total | 0.00 | 0.00 | 0.00 | 0.00 | 0.00 |

2620

2621

[ "not_empty", "any", "date", "not_statrt_with(Losses for LOC)", null, "any", "number", "any", "any", "any" ];

Policy Level Loss non LOC

Reported by Meadowbrook Insurance Group Inc.

Page 6 of 27

FIG. 26B

Policy Level Loss Detail Report No Loc

As of: 03/18/2019

Program: CREST TRUCKING CONCEPTONE (WM) For policy VPA0329982
PROGRESSIVE TRANSPORTATION SER1360 W PACIFIC COAST HWY　LONG BEACH　CA90810

| [LOC] Policy Number / [Unit#] Location Name | Acc State | LOB Status | Loss Date | Report Date / Close Date | Claimant Name | Claim Number | Loss Cause | Accident Description | Paid Loss | Paid Expense | Loss Reserve | Expense Reserve | Total Incurred |
|---|---|---|---|---|---|---|---|---|---|---|---|---|---|
| | | | | | | | | Losses for Policy 0329982, Mod - [00] - 08/01/2015 to 08/01/2016 | | | | | |
| | | | | | | | | Losses for LOC: (41) STATE NATIONAL INSURANCE CO | | | | | |
| 2610 → [41] VPA 0329982-01 | CA | O | 03/17/2016 | 03/21/2016 | LOPEZ  DIANA | ALWM16002183 | BI | Per insured, other party tried | 0.00 | 0.00 | 22,501.00 | 0.00 | 23,736.00 |
| 00001 HIRED AND NON-OWNED AUTO | | | | | | | | | | | | | |
| [41] VPA 0329982-01 | CA | C | 03/17/2016 | 03/21/2016 / 10/05/2016 | LOPEZ  DIANA | ALWM16002183 | PD | Per insured, other party tried | 8,174.01 | 0.00 | 0.00 | 0.00 | 8,174.01 |
| 2630 → 00001 HIRED AND NON-OWNED AUTO | AFV | | | | | | | | | | | | |
| Claim No. ALWM16002183 | | | | | | | | Total | 8,174.01 | 1,235.00 | 22,501.00 | 0.00 | 31,910.01 |
| Unit # 00001 | | | | | | | | Total | 8,174.01 | 1,235.00 | 22,501.00 | 0.00 | 31,910.01 |
| | | | | | | | | Losses for LOC: (41) STATE NATIONAL INSURANCE CO | | | | | |
| [41] VPA 0329982-01 | CA | C | 08/14/2015 | 08/14/2015 / 11/03/2015 | UNKNOWN CLAIMAN T | ALWM15008030 | PD | Insured was struck by another | 0.00 | 0.00 | 0.00 | 0.00 | 0.00 |
| 00003 GROSS RECEIPTS-VEH SCH ON FILE | AFV | | | | | | | | | | | | |
| Claim No. ALWM15008030 | | | | | | | | Total | 0.00 | 0.00 | 0.00 | 0.00 | 0.00 |
| | | | | | | | | Losses for LOC: (41) STATE NATIONAL INSURANCE CO | | | | | |
| [41] VPA 0329982-01 | CA | C | 09/16/2015 | 05/09/2016 / 09/14/2016 | ANTONINI BROTHE RS | ALWM16003686 | PD | Both vehicles making a left ha | 0.00 | 0.00 | 0.00 | 0.00 | 0.00 |
| 00003 GROSS RECEIPTS-VEH SCH ON FILE | AFV | | | | | | | | | | | | |
| Claim No. ALWM16003686 | | | | | | | | Total | 0.00 | 0.00 | 0.00 | 0.00 | 0.00 |

2621 → [ "not_empty", "any", "date", "not_statrt_with(Losses for LOC)" , null, "any", "number", "any", "any", "any", "any" ], Policy Level Loss non LOC Page 6 of 27

Reported by Meadowbrook Insurance Group Inc.

FIG. 26C

Policy Level Loss Detail Report No Loc

Program: CREST TRUCKING CONCEPTONE (WM) For policy VPA0329982

PROGRESSIVE TRANSPORTATION SER1360 W PACIFIC COAST HWY   LONG BEACH   CA90810

As of: 03/18/2019

| [LOC] Policy Number | Acc State | Loss Date | Claimant Name | | | | | | |
| [Unit#] Location Name | LOB Status | Report Date Close Date | Claim Number | Loss Cause | Accident Description | Paid Loss | Paid Expense | Loss Reserve | Expense Reserve | Total Incurred |

Losses for Policy 0329982, Mod – [00] – 08/01/2015 to 08/01/2016

Losses for LOC: (41) STATE NATIONAL INSURANCE CO

| [41] VPA 0329982-01 | CA | 03/17/2016 | LOPEZ   DIANA | | Per insured, other party tried | 0.00 | 0.00 | 22,501.00 | 0.00 | 23,736.00 |
| 00001 HIRED AND NON-OWNED AUTO | O | 03/21/2016 | ALWM16002183 | BI | | | | | | |
| [41] VPA 0329982-01 | CA | 03/17/2016 | LOPEZ   DIANA | | Per insured, other party tried | 8,174.01 | 0.00 | 0.00 | 0.00 | 8,174.01 |
| 00001 HIRED AND NON-OWNED AUTO | AFV C | 03/21/2016 10/05/2016 | ALWM16002183 | PD | | | | | | |
| | | | Claim No. ALWM16002183 | | Total | 8,174.01 | 0.00 | 22,501.00 | 0.00 | 31,910.01 |
| | | | Unit # 00001 | | Total | 8,174.01 | 1,235.00 | 22,501.00 | 0.00 | 31,910.01 |

Losses for LOC: (41) STATE NATIONAL INSURANCE CO

| [41] VPA 0329982-01 | CA | 08/14/2015 | UNKNOWN CLAIMAN T | | Insured was struck by another | 0.00 | 0.00 | 0.00 | 0.00 | 0.00 |
| 00003 GROSS RECEIPTS-VEH SCH ON FILE | AFV C | 08/14/2015 11/03/2015 | ALWM15008030 | PD | | | | | | |
| | | | Claim No. ALWM15008030 | | Total | 0.00 | 0.00 | 0.00 | 0.00 | 0.00 |

Losses for LOC: (41) STATE NATIONAL INSURANCE CO

| [41] VPA 0329982-01 | CA | 09/16/2015 | ANTONINI BROTHE RS | | Both vehicles making a left ha | 0.00 | 0.00 | 0.00 | 0.00 | 0.00 |
| 00003 GROSS RECEIPTS-VEH SCH ON FILE | AFV C | 05/09/2016 09/14/2016 | ALWM16003686 | PD | | | | | | |
| | | | Claim No. ALWM16003686 | | Total | 0.00 | 0.00 | 0.00 | 0.00 | 0.00 |

[ "not_empty", "any", "any", "any" null, null, null, null, null, null ];

2622

2630

Policy Level Loss non LOC

Reported by Meadowbrook Insurance Group Inc.

FIG. 26D

Policy Level Loss Detail Report No Loc

Program: CREST TRUCKING CONCEPTONE (WM) For policy VPA0329982

PROGRESSIVE TRANSPORTATION SER1360 W PACIFIC COAST HWY   LONG BEACH   CA90810

As of: 03/18/2019

| [LOC] Policy Number [Unit#] Location Name | Acc State | LOB Status | Loss Date Report Date Close Date | Claimant Name | Claim Number | Loss Cause | Accident Description | Paid Loss | Paid Expense | Loss Reserve | Expense Reserve | Total Incurred |
|---|---|---|---|---|---|---|---|---|---|---|---|---|
| Losses for Policy 0329982, Mod - [00] - 08/01/2015 to 08/01/2016 | | | | | | | | | | | | |
| Losses for LOC: (41) STATE NATIONAL INSURANCE CO | | | | | | | | | | | | |
| [41] VPA 0329982-01 | CA | O | 03/17/2016 03/21/2016 | LOPEZ DIANA | ALWM16002183 | BI | Per insured, other party tried | 0.00 | 0.00 | 22,501.00 | 0.00 | 23,736.00 |
| 00001 HIRED AND NON-OWNED AUTO | | | | | | | | | | | | |
| [41] VPA 0329982-01 | CA | | 03/17/2016 | LOPEZ DIANA | ALWM16002183 | PD | Per insured, other party tried | 8,174.01 | 0.00 | 0.00 | 0.00 | 8,174.01 |
| 00001 HIRED AND NON-OWNED AUTO | | AFV C | 03/21/2016 10/05/2016 | | | | | | | | | |
| Claim No. ALWM16002183 | | | | | | | Total | 8,174.01 | 1,235.00 | 22,501.00 | 0.00 | 31,910.01 |
| Unit # 00001 | | | | | | | Total | 8,174.01 | 1,235.00 | 22,501.00 | 0.00 | 31,910.01 |
| Losses for LOC: (41) STATE NATIONAL INSURANCE CO | | | | | | | | | | | | |
| [41] VPA 0329982-01 | CA | | 08/14/2015 | UNKNOWN CLAIMAN T | ALWM15008030 | PD | Insured was struck by another | 0.00 | 0.00 | 0.00 | 0.00 | 0.00 |
| 00003 GROSS RECEIPTS-VEH SCH ON FILE | | AFV C | 08/14/2015 11/03/2015 | | | | | | | | | |
| Claim No. ALWM15008030 | | | | | | | Total | 0.00 | 0.00 | 0.00 | 0.00 | 0.00 |
| Losses for LOC: (41) STATE NATIONAL INSURANCE CO | | | | | | | | | | | | |
| [41] VPA 0329982-01 | CA | | 09/16/2015 | ANTONINI BROTHE RS | ALWM16003686 | PD | Both vehicles making a left ha | 0.00 | 0.00 | 0.00 | 0.00 | 0.00 |
| 00003 GROSS RECEIPTS-VEH SCH ON FILE | | AFV C | 05/09/2016 09/14/2016 | | | | | | | | | |
| Claim No. ALWM16003686 | | | | | | | Total | 0.00 | 0.00 | 0.00 | 0.00 | 0.00 |

[ "not_empty", "any", "any", "any" null, null, null, null, null ],

2622

2640

Policy Level Loss non LOC

Page 6 of 27

Reported by Meadowbrook Insurance Group Inc.

FIG. 26E

Policy Level Loss Detail Report No Loc

Program: CREST TRUCKING CONCEPTONE (WM) For policy VPA0329982

PROGRESSIVE TRANSPORTATION SER1360 W PACIFIC COAST HWY    LONG BEACH    CA90810

As of: 03/18/2019

| [LOC] Policy Number [Unit#] Location Name | Acc State LOB | Loss Date Report Date Close Date Status | Claimant Name Claim Number | Loss Cause | Accident Description | | Paid Loss | Paid Expense Loss | Loss Reserve | Expense Reserve | Total Incurred |
|---|---|---|---|---|---|---|---|---|---|---|---|

Losses for Policy 0329982, Mod - [00] - 08/01/2015 to 08/01/2016

Losses for LOC: (41) STATE NATIONAL INSURANCE CO

| [41] VPA 0329982-01 | CA | 03/17/2016 | LOPEZ DIANA | | Per insured, other party tried | | 0.00 | 1,235.00 | 22,501.00 | 0.00 | 23,736.00 |
| 00001 HIRED AND NON-OWNED AUTO | AFV | 03/21/2016 | ALWM16002183 | BI | | | | | | | |

| [41] VPA 0329982-01 | CA | 03/17/2016 | LOPEZ DIANA | | Per insured, other party tried | | 8,174.01 | 0.00 | 0.00 | 0.00 | 8,174.01 |
| 00001 HIRED AND NON-OWNED AUTO    2650 | AFV  C | 03/21/2016 10/05/2016 | ALWM16002183 | PD | | | | | | | |

Claim No. ALWM16002183                                                     Total    8,174.01    1,235.00    22,501.00    0.00    31,910.01
Unit # 00001                                                                Total    8,174.01    1,235.00    22,501.00    0.00    31,910.01

Losses for LOC: (41) STATE NATIONAL INSURANCE CO

| [41] VPA 0329982-01 | CA | 08/14/2015 | UNKNOWN CLAIMAN T | | Insured was struck by another | | 0.00 | 0.00 | 0.00 | 0.00 | 0.00 |
| 00003 GROSS RECEIPTS-VEH SCH ON FILE | AFV  C | 08/14/2015 11/03/2015 | ALWM15008030 | PD | | | | | | | |

Claim No. ALWM15008030                                                     Total    0.00    0.00    0.00    0.00    0.00

Losses for LOC: (41) STATE NATIONAL INSURANCE CO

| [41] VPA 0329982-01 | CA | 09/16/2015 | ANTONINI BROTHE RS | | Both vehicles making a left ha | | 0.00 | 0.00 | 0.00 | 0.00 | 0.00 |
| 00003 GROSS RECEIPTS-VEH SCH ON FILE | AFV  C | 05/09/2016 09/14/2016 | ALWM16003686 | PD | | | | | | | |

Claim No. ALWM16003686                                                     Total    0.00    0.00    0.00    0.00    0.00

2622 → [ "not_empty", "any", "any", "any" null, null, null, null, null ],

Policy Level Loss non LOC

Reported by Meadowbrook Insurance Group Inc.

Page 6 of 27

FIG. 26F

Policy Level Loss Detail Report No Loc

Program: CREST TRUCKING CONCEPTONE (WM) For policy VPA0329982

PROGRESSIVE TRANSPORTATION SER1360 W PACIFIC COAST HWY    LONG BEACH          CA90810                                    As of:
                                                                                                                        03/18/2019

| [LOC] Policy Number | Acc State | Loss Date | Claimant Name | Accident Description | | | | | | |
|---|---|---|---|---|---|---|---|---|---|---|
| [Unit#] Location Name | LOB | Report Date | Claim Number | Loss Cause | | Paid Loss | Paid Expense | Loss Reserve | Expense Reserve | Total Incurred |
| | Status | Close Date | | | | | | | | |

Losses for Policy 0329982, Mod - [00] - 08/01/2015 to 08/01/2016

Losses for LOC: (41) STATE NATIONAL INSURANCE CO

| | | | | | | | | | | |
|---|---|---|---|---|---|---|---|---|---|---|
| [41] VPA 0329982-01 | CA | 03/17/2016 | LOPEZ   DIANA | Per insured, other party tried | | 0.00 | 1,235.00 | 22,501.00 | 0.00 | 23,736.00 |
| 00001 HIRED AND NON- OWNED AUTO | AFV | 03/17/2016 | ALWM16002183 | BI | | | | | | |
| [41] VPA 0329982-01 | CA | 03/17/2016 | LOPEZ   DIANA | Per insured, other party tried | | 8,174.01 | 0.00 | 0.00 | 0.00 | 8,174.01 |
| 00001 HIRED AND NON- OWNED AUTO    2650 | AFV | 03/21/2016 | ALWM16002183 | PD | | | | | | |
| | C | 10/05/2016 | | | | | | | | |
| | | | Claim No. ALWM16002183 | | Total | 8,174.01 | 1,235.00 | 22,501.00 | 0.00 | 31,910.01 |
| | | | Unit # 00001 | | Total | 8,174.01 | 1,235.00 | 22,501.00 | 0.00 | 31,910.01 |
| | | | Losses for LOC: (41) STATE NATIONAL INSURANCE CO | | | | | | | |
| [41] VPA 0329982-01 | CA | 08/14/2015 | UNKNOWN CLAIMANT T | Insured was struck by another | | 0.00 | 0.00 | 0.00 | 0.00 | 0.00 |
| 00003 GROSS RECEIPTS-VEH SCH ON FILE | AFV | 08/14/2015 | ALWM15008030 | PD | | | | | | |
| | C | 11/03/2015 | | | | | | | | |
| | | | Claim No. ALWM15008030 | | Total | 0.00 | 0.00 | 0.00 | 0.00 | 0.00 |
| | | | Losses for LOC: (41) STATE NATIONAL INSURANCE CO | | | | | | | |
| [41] VPA 0329982-01 | CA | 09/16/2015 | ANTONINI BROTHE RS | Both vehicles making a left ha | | 0.00 | 0.00 | 0.00 | 0.00 | 0.00 |
| 00003 GROSS RECEIPTS-VEH SCH ON FILE | AFV | 05/09/2016 | ALWM16003686 | PD | | | | | | |
| 2623 | C | 09/14/2016 | | | | | | | | |
| | | | Claim No. ALWM16003686 | | Total | 0.00 | 0.00 | 0.00 | 0.00 | 0.00 |

[ null, "any", "any" null, null, null, null, null, null, null ]

Policy Level Loss non LOC

Page 6 of 27                                    Reported by Meadowbrook Insurance Group Inc.

<s> Risk Page 2 Loss Run
Policy Term 01/01/2021 - 12/31/2021
Report Date : 10/07/2021 Policy
Number: AFE15145 Valuation Date:
10/05/2021 Currency: USD Claimant
Name Loss Tpe Div / H.O. Accident /
Loss Description

2751

<s> Risk Page <mask> Loss <mask>
Policy Term 01/01/2021 - 12/31/2021
Report <mask> : 10/07/2021 <mask>
Number: AFE15145 Valuation Date:
<mask> Currency: USD Claimant <mask>
Loss Tpe Div / H.O. <mask> / Loss
Description

MACHINE LEARNING-BASED TECHNIQUES FOR DIGITAL DATA EXTRACTION FROM DOCUMENTS WITH COMPLEX FORMATS

CROSS-REFERENCE TO RELATED APPLICATIONS

This application claims priority to U.S. Provisional Patent Application No. 63/419,133, titled "DIGITAL DATA EXTRACTION FROM DOCUMENTS WITH COMPLEX FORMATS" filed Oct. 25, 2022, which is incorporated herein by reference in its entirety.

DESCRIPTION OF THE RELATED ART

Scientific, business and other information contained in many different types of legacy systems and paper documents could be of much value to contemporary society. Many archives contain hosts of documents with information organized in repeating patterns, such as ledgers or books of account, for example, organized with many entries of roughly the same type. U.S. patent Ser. No. 11/210,473, for example, describes a natural language generator adapted to a particular field. The '473 patent describes how a large corpus of text in a particular field, for example, in one line of business, is used to train a machine learning model so that it is adapted to the particular lexicon that is used in that particular field. Then, this information is used in natural language generation. However, the '473 patent describes adaptation of machine learning to generate text, not to ingest information gleaned from a document.

Insurance companies review "loss runs" provided by previous insurance carriers of an insured entity to assess risk before providing a quote for the insured entity. The term "loss run" as used in the insurance industry is a record of claims made by insured entities against a carrier. Such information may be stored in paper records, and in various electronic formats, such as PDFs. Often, insurance carriers wish to retrieve information about insured entities, or prospective insured entities, as part of the process of risk assessment in the underwriting process. However, inefficiencies are introduced by the large amounts of data trapped in poorly formatted forms.

For example, documents may contain images with information spatially arranged in a table or form. Such documents may be complex with multiple row headers designating columns from which information is difficult for standard software to extract. Each record or entry of such a form may span more than one row, making it difficult for an automated process to detect the end of one record or entry and the beginning of a second one. Some entries may have more rows than others, and there may be no borders or gaps between columns and rows. Some record or entry content may spill over into a following row that may seem to be associated with another record or entry or may be squeezed into margins or the like.

Such legacy records can create data gaps for underwriters as they work with incomplete or inaccurate information while valuable data may be squandered and unused. In the alternative, large staffs of data entry personnel may be used to enter such information in ways that are meaningful for a system to analyze, which can be costly. In addition, underwriting, and thus broker response, may be slowed, which can result in lost business. Although Optical Character Recognition (OCR) software can be used to facilitate this process, OCR software does not classify items of information received from a document into categories and with category designations useful for risk analysis.

SUMMARY

Implementations of the disclosure relate to multi-modal methods and systems for automatically extracting data from documents having complex data formats, including loss run documents.

In one embodiment, a non-transitory computer-readable medium has executable instructions stored thereon that, when executed by a processor, causes the processor to perform operations comprising: obtaining a first image of a first document containing multiple fields spatially arranged along multiple dimensions; determining multiple first locations within the first image, each of the first locations identifying a spatial position in the first image of a respective one of the fields; extracting multiple tokens from the fields; generating, using a first trained model, based at least on the first image, the first locations, and the tokens, multiple first predictions, each of the first predictions indicating a classification of a respective one of the tokens; generating, using a second trained model, based at least on the first image, multiple second predictions identifying multiple second locations, each of the second locations identifying a spatial position in the first image of a respective entry of multiple entries, each of the entries including one or more rows of tokens; and linking, according to the first locations and the second locations, each of the tokens to one of the entries.

In some implementations, the operations further comprise: converting the first image to a numeric representation. For example, the first image can be converted into a standardized numerical input represented as a 3-d vector of dimension W×H×3, where W and H represent the width and height of the document image and 3 represents the 3 channels for the pixels of the first image. In some implementations, generating, using the first trained model, based at least on the first image, the first locations, and the tokens, the multiple first predictions can comprise: generating, using the first trained model, based at least on the numeric representation of the first image, the first locations, and the tokens, the multiple first predictions. In some implementations, generating, using the second trained model, based at least on the first image, multiple second predictions can comprises: generating, using the second trained model, based at least on the numeric representation of the second image, the multiple second predictions.

In some implementations, the operations further comprise: after linking each of the tokens to one of the entries, generating a table comprising multiple records, each of the records comprising an entry and one or more of the tokens linked to the entry.

In some implementations, the operations further comprise: transmitting each token jointly with the classification corresponding to the token.

In some implementations, the classification of at least some of the tokens comprises a class of the token and a position of the token within a sequence.

In some implementations, the first document is a loss run document; and the class of the token is selected from the group comprising: a loss run start date, a loss run end date, a loss amount, a policy number, a policyholder name, a claim number, or a claimant name.

In some implementations, the classification of each token indicates whether or not the token is associated with a predefined class.

In some implementations, the operations further comprise: determining that the first document is not formatted in accordance with any of multiple document templates; and in response to determining that the first document is not formatted in accordance with any of the multiple document templates, performing the operations of determining the first locations, extracting the multiple tokens, generating the first locations, generating the second locations, and linking each of the tokens to one of the entries.

In some implementations, the operations further comprise: obtaining a second image of a second document containing multiple fields spatially arranged along multiple dimensions; determining that the second document is formatted in accordance with a first document template of multiple document templates; and in response to determining that the second document is formatted in accordance with the first document template, extracting, according to the first document template, information from the fields of the second document.

In some implementations, determining that the second document is formatted in accordance with the first document template comprises: extracting a first document signature from the document, the first document signature comprising at least one item of information that is the same across multiple entries of a table of the second document; and comparing the first document signature to a second document signature of the first document template.

In some implementations, extracting, according to the first document template, information from the fields of the second document, comprises: determining, for each field of the multiple fields, according to the first document template, a regular expression expected for an item of information of each field; and determining whether or not the item of information of each field is consistent with the regular expression that is expected for the item of information.

In some implementations, extracting, according to the first document template, information from the fields of the second document, further comprises: in response to determining that a first item of information of a first field of the multiple fields is inconsistent with the regular expression that is expected for the first item of information, using a backtracking algorithm to find a correct item of information associated with the first field.

In some implementations, each of the first locations comprises a set of field coordinates identifying the spatial position of the respective one of the fields, and each of the second locations comprises a set of entry coordinates identifying the spatial position of the respective entry.

In some implementations, the first trained model comprises a transformer architecture including a spatial-aware self-attention mechanism configured to process relative positional relationships among items of information; and the second trained model comprises an architecture comprising a convolutional neural network and a transformer.

In some implementations, the operations further comprise: determining, using a third trained model, based at least on a filename of the first document, a predicted class of the first document; after determining the predicted class of the first document, determining that the first document is not formatted in accordance with any of multiple document templates corresponding to the predicted class; and in response to determining that the first document is not formatted in accordance with any of multiple document templates corresponding to the predicted class, performing the operations of determining the first locations, extracting the multiple tokens, generating the first locations, generating the second locations, and linking each of the tokens to one of the entries.

In one embodiment, a non-transitory computer-readable medium has executable instructions stored thereon that, when executed by a processor, causes the processor to perform operations comprising: obtaining a first image of a first document containing multiple fields spatially arranged along multiple dimensions; determining that the first document is formatted in accordance with a first document template of multiple document templates; and in response to determining that the first document is formatted in accordance with the first document template, extracting, according to the first document template, information from the fields of the second document by: determining, for each field of the multiple fields, according to the first document template, a regular expression expected for an item of information of each field; and determining whether or not the item of information of each field is consistent with the regular expression that is expected for the item of information.

In some implementations, determining that the first document is formatted in accordance with the first document template comprises: extracting a first document signature from the document, the first document signature comprising at least one item of information that is the same across multiple entries of a table of the second document; and comparing the first document signature to a second document signature of the first document template.

In some implementations, extracting, according to the first document template, information from the fields of the first document, further comprises: in response to determining that a first item of information of a first field of the multiple fields is inconsistent with the regular expression that is expected for the first item of information, using a backtracking algorithm to find a correct item of information associated with the first field.

In some implementations, the operations further comprise: determining, using a trained model, based at least on a filename of the first document, a predicted class of the first document as a loss run; and in response to determining the predicted class of the first document as a loss run, performing the operation of determining that the first document is formatted in accordance with the first document template.

In one embodiment, a method comprises: obtaining, at a computing device, a first image of a first document containing multiple fields spatially arranged along multiple dimensions; determining, at the computing device, multiple first locations within the first image, each of the first locations identifying a spatial position in the first image of a respective one of the fields; extracting, at the computing device, multiple tokens from the fields; generating, at the computing device, using a first trained model, based at least on the first image, the first locations, and the tokens, multiple first predictions, each of the first predictions indicating a classification of a respective one of the tokens; generating, at the computing device, using a second trained model, based at least on the first image, multiple second predictions identifying multiple second locations, each of the second locations identifying a spatial position in the first image of a respective entry of multiple entries, each of the entries including one or more rows of tokens; and linking, at the computing device, according to the first locations and the second locations, each of the tokens to one of the entries.

In some implementations, the method further comprises: after linking each of the tokens to one of the entries, generating, at the computing device, a table comprising multiple records, each of the records comprising an entry and one or more of the tokens linked to the entry.

In one embodiment, a method comprises: determining, by a template determiner, whether a document follows a previously-used document template, and extracting, according to the previously-used document template, the information from a plurality of fields when the document follows the previously-used document template; and when the document fails to follow one of the previously-used document templates, automatically invoking a template-less ingestion method. The template-less ingestion method can include transmitting to a first machine learning model the image, a plurality of items of information extracted from the plurality of fields, and a plurality of sets of field coordinates, each set of field coordinates identifying a spatial position of a respective field; the first machine learning model generating a respective classification for each item of information; transmitting the image to a second machine learning model that is distinct from the first machine learning model; the second machine learning model generating, from the image, a plurality of sets of entry coordinates, each set of entry coordinates identifying a spatial position of an entry of a plurality of entries, each entry including one or more rows of items of information; relating, according to the plurality of sets of field coordinates and according to the plurality of sets of entry coordinates, each item of information to a respective entry of the plurality of entries; and transmitting each item of information together with the classification for each item of information to a data ingester.

In some implementations, the first machine learning model is pre-trained with input weights using a number of unlabeled scanned document images.

In some implementations, the first machine learning model is further fine-tuned with an extraction schema corresponding to the classifications for the items of information.

In some implementations, the first machine learning model has a transformer architecture that includes a spatial-aware self-attention mechanism configured to process relative positional relationships among the items of information.

In some implementations, the first machine learning model has a Bidirectional Encoder Representations from Transformers architecture.

In some implementations, the first machine learning model has a LayoutLMv2 architecture.

In some implementations, the second machine learning model has an architecture that includes a convolutional neural network and a transformer.

In some implementations, the second machine learning model has a DETR architecture.

In some implementations, when extracting, according to the previously-used document template, the method also includes a process for handling data in a next field that is inconsistent. When the data in a next field is inconsistent, according to the previously defined template, with a first header designation for the next field, the method includes backtracking to the most recent field with content that is consistent with header designation for the field and then reassigning following data to the next field or excluding the following data from the next field.

In some implementations, the determining whether the document follows a previously-used document template may be performed using a subsequence matcher.

In one embodiment, a template-based data ingestion engine, which is configured to extract data from a document containing a plurality of entries, includes a template generator and a data extractor. The template generator is configured to generate a first template and includes a designator and a cell header selector. The designator is configured to receive a designation of a first entry of the plurality of entries and a designation of a first cell of the entry. The cell header selector is configured to receive a first header designation regarding the content of the first cell. The data extractor is configured to extract the data contained in the document by applying the first template to remaining entries of the plurality of entries.

In some implementations of the data ingestion engine, when the data extractor reaches data in the remaining entries with content that is inconsistent with the first header designation, the data extractor backtracks to the most recent cell with content that is consistent with the first header designation and then reassigns following data to a next cell or excludes the following data from the next cell.

In some implementations of the data ingestion engine, the template generator includes a column designator configured to receive a designation of a column of a table contained in the document and a row designator configured to receive a designation of a row of the table.

In some implementations of the data ingestion engine, each entry of the plurality of entries includes at least one row.

In some implementations of the data ingestion engine, each entry of the plurality of entries includes at least two rows.

In some implementations of the data ingestion engine, the column designator includes a user interface element configured to facilitate user selection of the row by the user highlighting portions of the document and the row designator may include a user interface element configured to facilitate user selection of the column by the user highlighting portions of the document.

In some implementations of the data ingestion engine, the first header designation includes a regular expression type selection received from the user designating a type of data contained in the first cell. For example, when the data extractor reaches data in a cell of the remaining entries containing content that is inconsistent with the regular expression type selection for the cell, the data extractor backtracks to the most recent cell with content that is consistent with the regular expression type selection, and then reassigns following data to a next cell or excludes the following data from the next cell.

In some implementations of the data ingestion engine, data is processed in the template created as a JSON file.

In some implementations of the data ingestion engine, the designator receives a designation of a table signature that includes text, such that the data ingestion engine uses the table signature to identify entries that belong to the plurality of entries.

In one embodiment, a computer hardware system implementing machine learning based ingestion of information from an image of a document containing headers and a plurality of fields, comprises: a character recognizer extracting a plurality of items of information from the plurality of fields on the image and extracting a plurality of sets field coordinates from the image, each set of field coordinates identifying a spatial position of a respective field; a first machine learning model receiving, from the character recognizer, the image, the plurality of items of information and the plurality of sets of field coordinates, and generating a respective classification for each of item of information; a second machine learning model distinct from the first machine learning model, the second machine learning model receiving the image, and generating, from the image, a plurality of sets of entry coordinates, each set of entry coordinates identifying a spatial position of an entry of a plurality of entries, wherein each entry includes one or more rows of items of information; and a linker relating, according to the plurality of sets of field coordinates and according to the plurality of sets of entry coordinates, each item of information to a respective entry of the plurality of entries, and transmitting each item of information together with the classification for each item of information to a data ingester.

In some implementations of the computer hardware system, the document contains headers describing the plurality of fields.

In some implementations of the computer hardware system, the first machine learning model is fine-tuned with an extraction schema corresponding to the classifications for the items of information.

In some implementations of the computer hardware system, the first machine learning model is pre-trained with input weights using a number of unlabeled scanned document images.

In some implementations of the computer hardware system, the plurality of entries includes entries containing a repeating pattern of items of information.

In some implementations of the computer hardware system also includes a template matcher that matches a previously stored template to the document, and that extracts the items of information from each cell of the document according to the previously stored template. In such a system, when the data in entries of a cell with content that is inconsistent, according to the previously defined template, with a first header designation for the cell is reached, the data extractor backtracks to the most recent cell with content that is consistent with header designation for the cell and then reassigns following data to a next cell or excludes the following data from the next cell.

As described herein, a document or a batch of documents may be received by the system according to the disclosure and processed in real time. While some implementations described herein make repeated reference to a single document to facilitate understanding, it should be appreciated that, in accordance with the disclosure, ingestion of a corpus of documents may be performed as part of a single batch process in real time.

Although the systems and methods described herein are often described with reference to a loss run table used in insurance documents, it will be understood that this is merely provided as an example, and the systems and methods described herein may be used with other types of documents containing tables and/or spatially arranged information. Although in one illustrated example an attachment is received via a data network, such as the Internet, other types of input are contemplated.

Other features and aspects of the disclosed technology will become apparent from the following detailed description, taken in conjunction with the accompanying drawings, which illustrate, by way of example, the features in accordance with implementations of the disclosed technology. The summary is not intended to limit the scope of any inventions described herein, which are defined by the claims and equivalents.

BRIEF DESCRIPTION OF THE DRAWINGS

The present disclosure, in accordance with one or more implementations, is described in detail with reference to the following figures. The figures are provided for purposes of illustration only and merely depict example implementations.

FIG. 3 shows an example document, including a table, that has been uploaded with an orientation that is turned, in accordance with some implementations of the disclosure.

FIG. 4 shows the document of FIG. 3 with its orientation partially corrected but tilted/misaligned, in accordance with some implementations of the disclosure.

FIG. 5 shows the document FIG. 4 with OCR software recognizing alphanumeric information contained therein, in accordance with some implementations of the disclosure.

FIG. 6 shows an example representation of the alphanumeric information contained in the document of FIG. 5 having been read by OCR, in accordance with some implementations of the disclosure.

FIG. 7B shows an example of a document being matched with previously used templates, in accordance with some implementations of the disclosure.

FIG. 8 shows the columns, left edge, and right edge of the table of FIG. 4 delineated, in accordance with some implementations of the disclosure.

FIG. 9 shows a demarcation of cells of a first entry of the table of FIG. 4, in accordance with some implementations of the disclosure.

FIG. 10 shows that a regular expression for a cell shown in FIG. 9 is selected, in accordance with some implementations of the disclosure.

FIG. 11 shows that a designation for a field is selected, in accordance with some implementations of the disclosure.

FIG. 12 shows the system grouping information by entry, in accordance with some implementations of the disclosure.

FIG. 13 shows extraction of the data based on the column and row delineations of the table, in accordance with some implementations of the disclosure.

FIG. 14 shows the system extracting information for each entry based on the information shown in the document of FIG. 13, in accordance with some implementations of the disclosure.

FIG. 15 shows a schema mapping with designations for each item of information shown in FIG. 14, in accordance with some implementations of the disclosure.

FIG. 16 shows a regular expression matrix that is expected by the template-based ingestion system for each item of information of each entry based on the designations earlier made, in accordance with some implementations of the disclosure.

FIG. 17B shows a flowchart depicting steps of an ingestion process, in accordance with some implementations of the disclosure.

FIG. 20 shows an example of a document generated by a data generator, in accordance with some implementations of the disclosure.

FIG. 21A shows an example of OCR data recognized from the document shown in FIG. 20, in accordance with some implementations of the disclosure.

FIG. 21C shows an example of OCR data recognized from the document shown in FIG. 20, in accordance with some implementations of the disclosure.

FIG. 22 shows an example of classification for each piece of information generated by a first machine learning model, in accordance with some implementations of the disclosure.

FIG. 23 shows an example of a structured loss run output based on a linking of the items of information with the entries, in accordance with some implementations of the disclosure.

FIG. 26A shows an example application of backtracking to match regular expressions to data in a document, in accordance with some implementations of the disclosure.

FIG. 26B shows an example application of backtracking to match regular expressions to data in a document, in accordance with some implementations of the disclosure.

FIG. 26C shows an example application of backtracking to match regular expressions to data in a document, in accordance with some implementations of the disclosure.

FIG. 26D shows an example application of backtracking to match regular expressions to data in a document, in accordance with some implementations of the disclosure.

FIG. 26E shows an example application of backtracking to match regular expressions to data in a document, in accordance with some implementations of the disclosure.

FIG. 26F shows an example application of backtracking to match regular expressions to data in a document, in accordance with some implementations of the disclosure.

FIG. 26G shows an example application of backtracking to match regular expressions to data in a document, in accordance with some implementations of the disclosure.

The figures are not exhaustive and do not limit the present disclosure to the precise form disclosed.

DETAILED DESCRIPTION

Existing text extraction software may not be well adapted to extract data from documents containing tables and/or following a complex system of organization, such as multi-row headers that items of each entry follow. Such software can lack accuracy in extracting and classifying information contained in rows or multi-row entries, or information contained in a complex table or form. As such, there is a need for improved systems and methods for automatically extracting data from documents having complex data formats, including loss run documents. To this end, implementations of the disclosure describe improved techniques for digital data extraction from documents having complex formats. In accordance with one set of implementations, template-based techniques for digital data extraction are described. In accordance with another set of implementations, machine-learning based techniques that leverage multiple modalities are described for digital data extraction.

Figure 1:
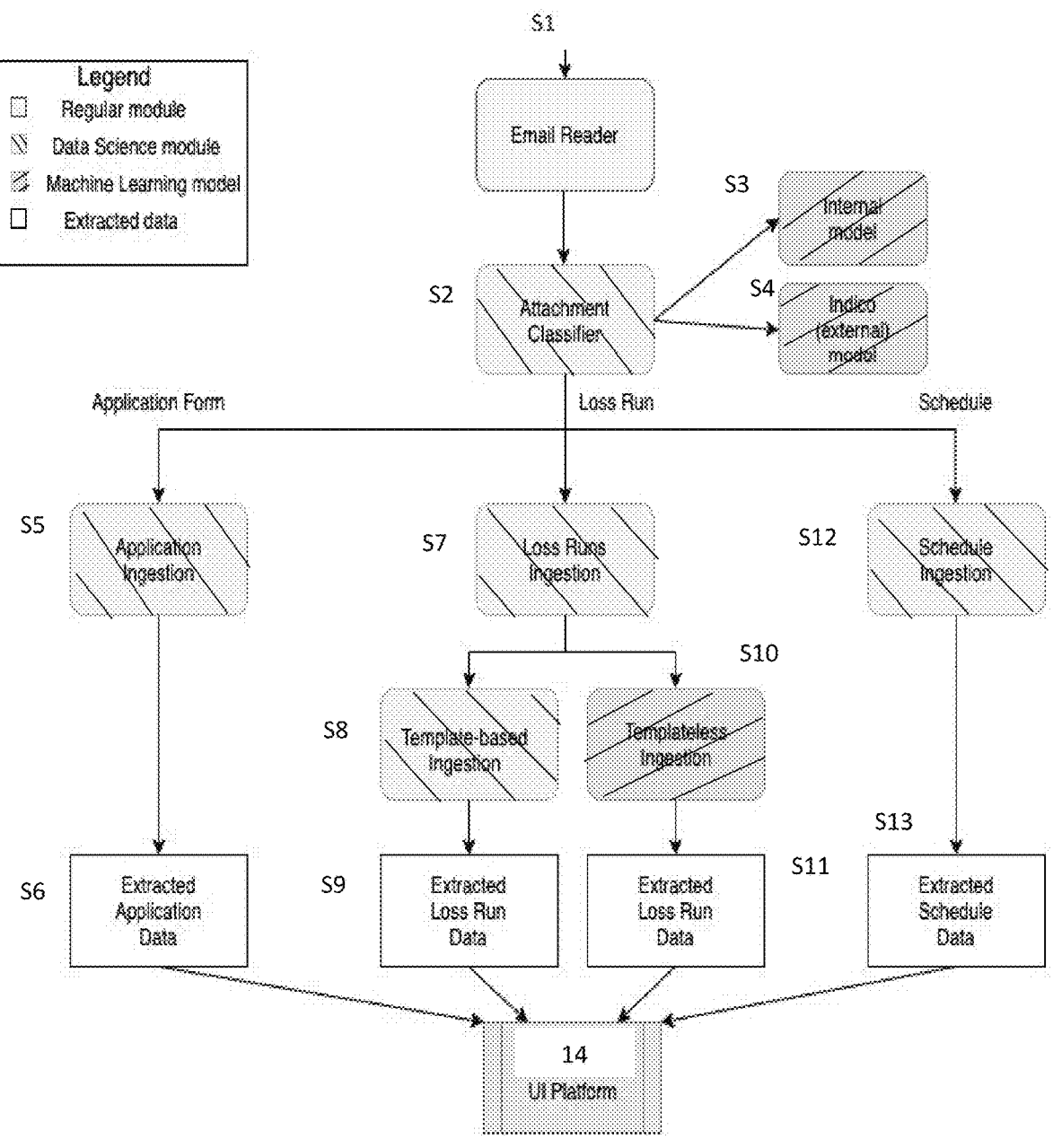
FIG. 1 is a flow diagram showing example components and data flow of a data ingestion system, in accordance with some implementations of the disclosure.
Figure 2:
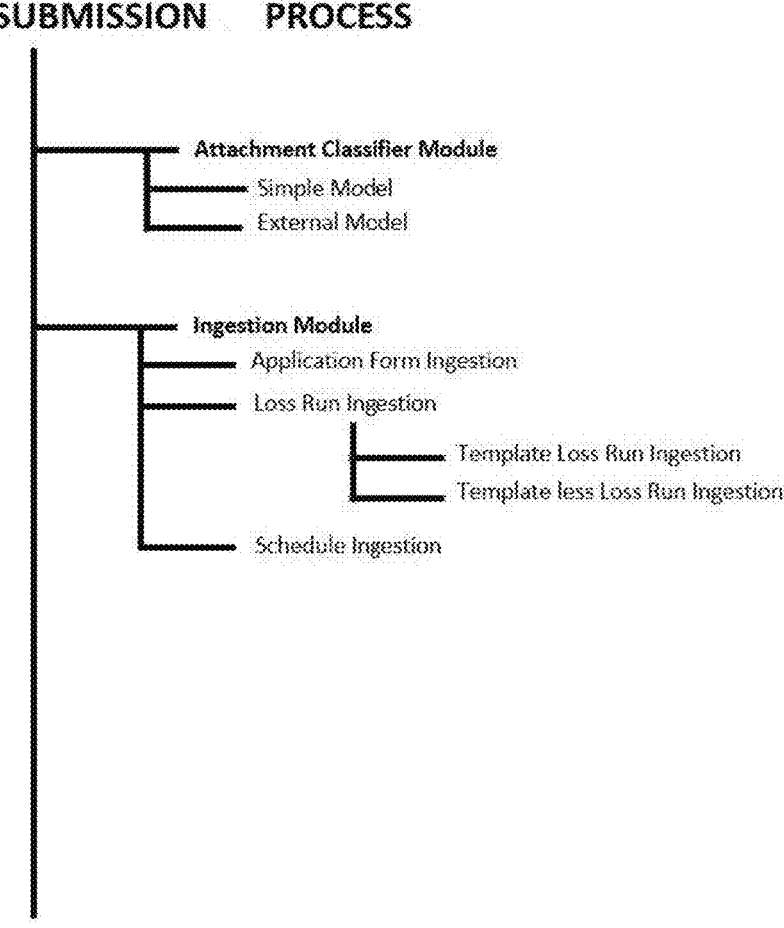
FIG. 2 shows an example outline of an ingestion process, in accordance with some implementations of the disclosure.

FIG. 1 is a flow diagram showing a high-level overview of a data ingestion system and process, with some details of the process provided subsequently, in accordance with some implementations of the disclosure. At S1 of FIG. 1, a browser or other type of email reader receives an email containing at least one document attachment. At S2, an attachment classifier decides on an appropriate destination for the attachment based on a type of the document.

According to an aspect of this embodiment, a filename of the received document, or a portion of the filename of the received document, can be used to predict whether the received document is a loss run or some other document type. By way of example, a logistic regression model trained on character trigrams of the attachment filename may be used to make this prediction. According to this example, the system would attempt to associate character level patterns in the filename with the document classifications. If this model does not have a prediction for the most likely class with a confidence above a threshold, for example, 60%, then a machine learning model that uses text contain within the received document to classify the document can be used to predict whether the document is a loss run. For example, an Indico-type machine learning model can be used to make such a prediction.

In implementations where text contained within the document is used to classify the document (e.g., predict whether it is a loss run), OCR can be used to recognize alphanumeric text of the received document, and this data/text can be fed to the machine learning model to predict whether it is a run loss document. For example, the machine learning model may process this data in a serial, one dimensional, manner.

As depicted by FIG. 1, if the attachment is determined (e.g., by the attachment classifier) to be an application form, then at S5 application ingestion is conducted to extract application data from the application form, and at S6 the extracted application data is sent to the user interface (UI) platform 14. FIG. 1 also shows that other document classifications can be made and that information from other types of documents, e.g., "schedules," for example in an Excel file or other spreadsheet format, may also be transmitted to a UI platform 14 for ingestion.

On the other hand, if it is determined at S2 that the attachment is a record of loss runs, then it is sent for loss run ingestion at S7. According to an aspect of the disclosure, if template-based ingestion is determined to be possible at S7 because the template of the document is similar to templates of previously ingested documents, then at S8 template-based ingestion takes place, details of which will be explained below, and the extracted loss run data is sent at S9 to UI platform 14. If a template-based ingestion is determined at S7 to be infeasible, impractical, or impossible, then template-less ingestion is performed at S10, details of which will be explained below, and the data extracted using template-less ingestion is sent at S11 to UI platform 14.

Before turning to the template-based and template-less real time ingestion processes described herein, it is instructive to consider a template creation process. Such a process is described with reference to FIGS. 3-16. A document 30, which may span one or more pages, is input to the system. For example, the document can arrive as an attachment to an email, can be scanned, or can be otherwise be input directly into the system. An example document type suited for the processes described herein is a loss run, which is a record of claims made by insured entities against a carrier. This historical information can be important for assessing future risk of an insured entity. Such loss runs are often maintained in tables of entries, each entry corresponding to a claim made by an insured entity and items of information related to the claims. An entry may be structured to include one or more rows of items of information in the table.

Upon receipt of the document 30 (e.g., as shown by FIG. 3), the orientation of a table 31 contained in the document 30 can first be corrected by rotating the table 31. Any tilting or misalignment may subsequently be adjusted (e.g., as depicted by FIG. 5). These steps can be performed manually by a user or automatically by the system. Thereafter, an OCR system can be used to read the alphanumerical characters of the document. FIG. 5 illustrates that the alphanumeric characters on the table 31 of document 30 have been read by the OCR system. FIG. 6 illustrates a representation of the alphanumeric information that has been read from the document.

Following OCR, the computer system or a human operator may recognize whether or not table 31 follows a previously generated template. To this end, the columns and the content of rows of table 31 may be recognized to follow a previously stored template. If a previously used template is not recognized for the documents, the template creation process can continue.

Figure 7A:
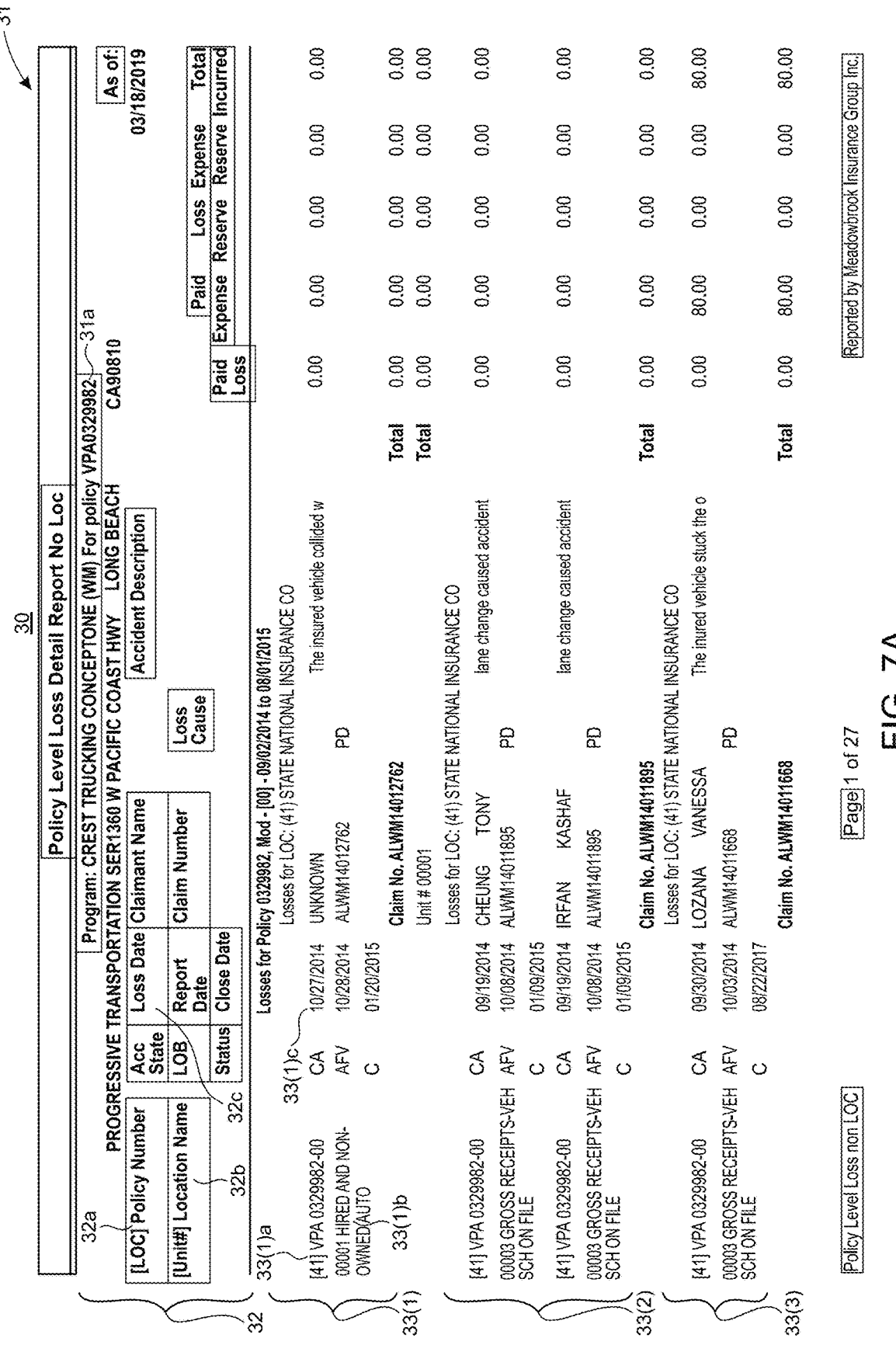
FIG. 7A shows an example of heading items of the document of FIG. 4 highlighted, in accordance with some implementations of the disclosure.
Figure 7C:
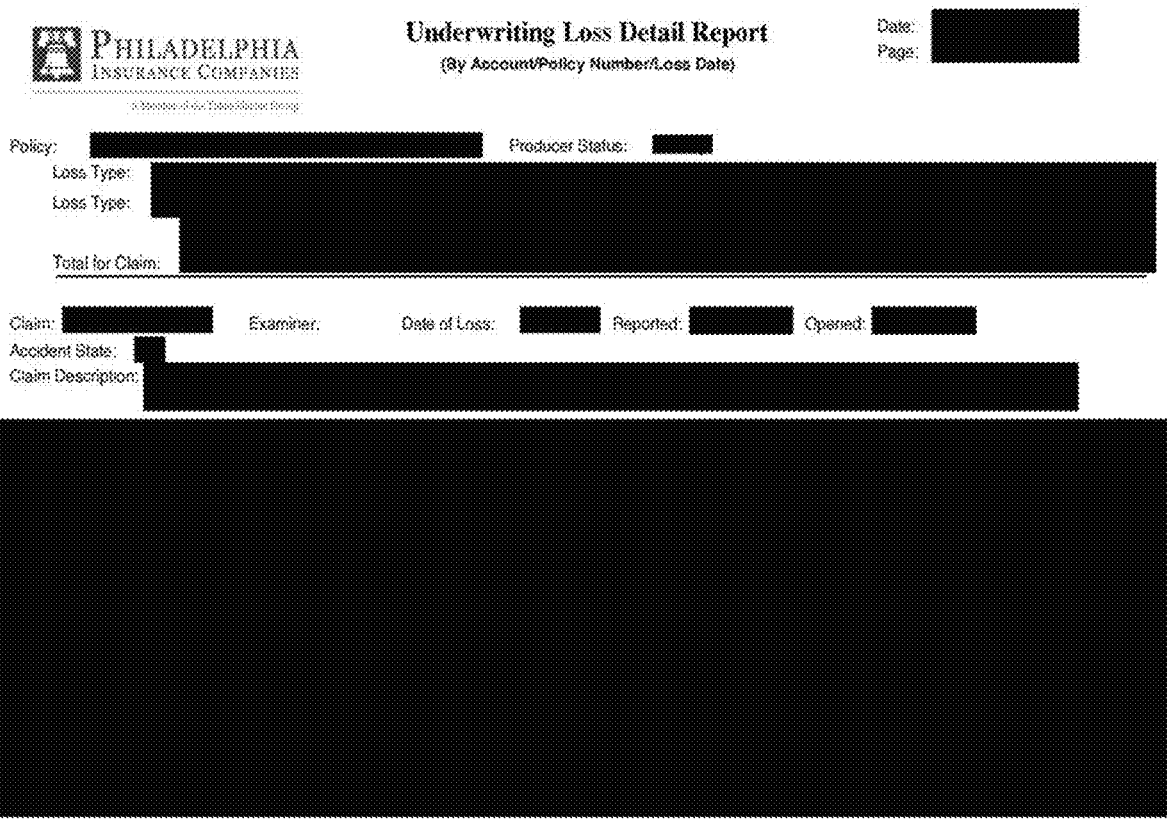
FIG. 7C shows an example of a template previously used and stored that is a candidate for matching with the document signature extracted from the document shown in FIG. 7B, in accordance with some implementations of the disclosure.
Figure 7D:
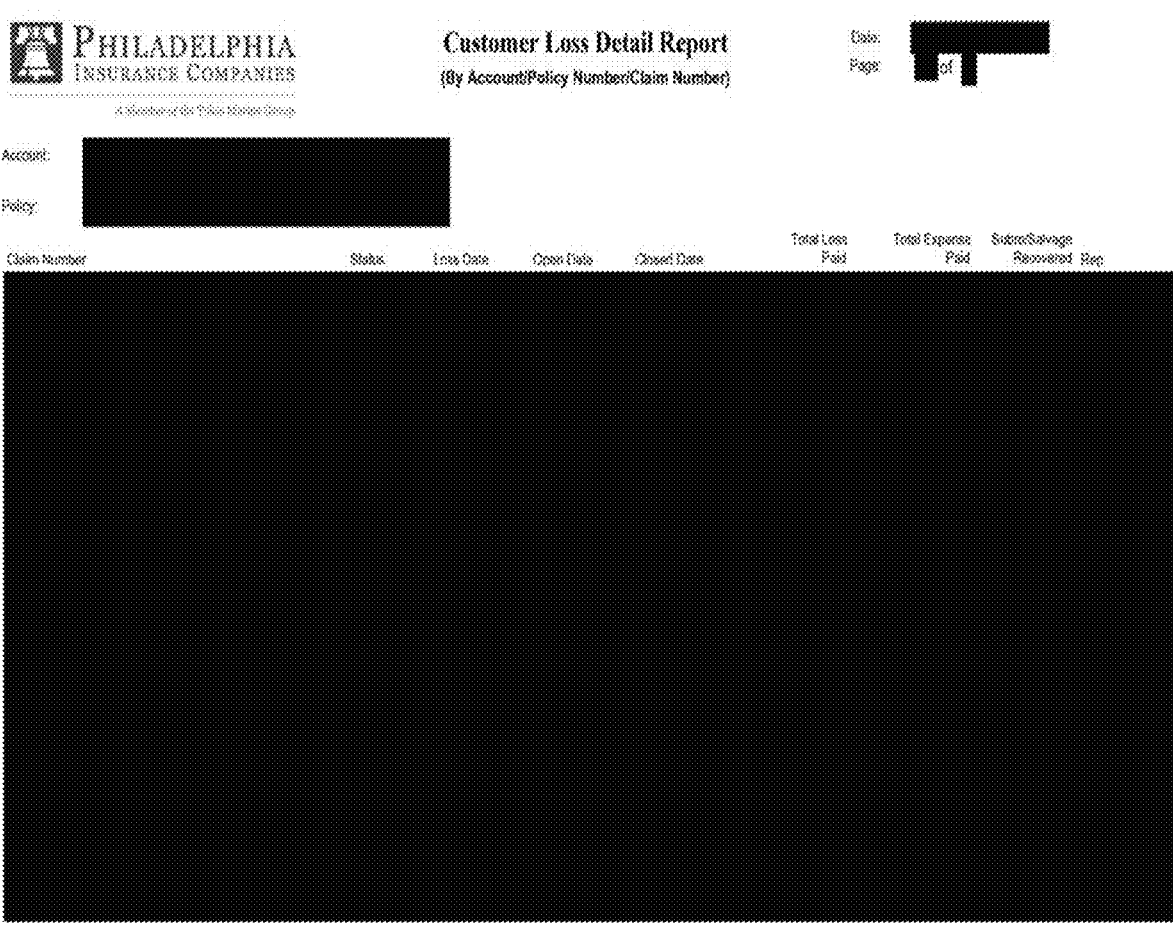
FIG. 7D shows an example of a template previously used and stored that is a candidate for matching with the document signature extracted from the document shown in FIG. 7B, in accordance with some implementations of the disclosure.

FIG. 7A illustrates page 1 of a document 30 containing the first portion of table 31 with a heading 32 and one or more entries 33(1)-33(c) that fall under the heading 32. The heading 32 of table 31 identifies multiple items 32a-c that describe corresponding items 33(1) a-c in the first entry 33(1), corresponding items in entry 33(2), and so forth, that also fall under the heading 32. As such, the heading items span several rows of the table 31, and the items of the entries corresponding to the headings may also span several rows of the table 31.

As shown in FIG. 7A, a user may select a document/table signature information 31a that is not variable in this loss run, as shown, for example, in the heading 32 of table 31. A document/table signature 31a may be any item of information that does not change in the items of information associated with entries. For example, the item of information "VPA0329982" does not change in the entries. According to an aspect of the disclosure, a user may designate the document/table signature by highlighting or selecting, for example using a mouse, track ball, touch control, or other control, the document/table signature 31a. In another aspect of the disclosure, indicating or designating the document/table signature 31a may be semi-automated or prefilled as a suggestion for the user to confirm. In another aspect of the disclosure, determining or designating a document or table signature 31a of a document may be a completely automated process, as described below.

FIG. 8 illustrates that columns 37 have been designated for the table 31. A user may draw lines or use highlighting or other features of a GUI to mark or delineate different columns of the document. A user may also delineate, via the GUI, the left margin 38a and right margin 38b of the table 31. For example, the user may use the GUI to draw lines between columns and between the logical entries of the table 31, or at least to delineate the first entry 33(1) as shown in FIG. 7A. In one example shown in FIG. 9, the user can select an area around the first entry 33(1) (e.g., by drawing a rectangle or box), and the system can generate cells corresponding to the first entry 33(1). Cells corresponding to the delineated rows of the remaining entries can be generated in a similar manner. Individual cells of the first entry may thus be demarcated with smaller rectangles or squares inside the bigger rectangle marking the entry as a whole.

By way of example, FIG. 9 illustrates that one or more rows corresponding to the first entry 33(1) of the table 31 have been grouped together by a rectangle 35 to begin to designate the matrix of data that will be designated by the template. Rectangle 35 has been drawn around several items to indicate different cells 36a-36c of the first entry 33(1). These cells or fields 36a-36c are shown as the smaller rectangles or squares inside rectangle 35 and have been designated by the user to indicate individual cells.

As depicted by FIG. 10, a user can select one of several regular expressions that will indicate the type of data that will be expected for each cell 36a-36c of the rectangle 35 corresponding to first entry 33(1) and for all subsequent entries of table 31. A regular expression, sometimes abbreviated herein as "RegExp", "RegEx", "Reg Exp," or "Reg Ex", is a sequence of characters that specifies a search pattern in a text. Such a pattern may be a specific letter or specific string of characters, or may be broader, such as [a-z], which would match any one lower case letter from "a" to "z."

As depicted by FIG. 10, a pop-up box 37a can be provided to aid user selection of a regular expression for each cell. In addition, a second pop-up box 37b as shown in FIG. 11 can then be provided for selection of a cell header as further described below. In this example, a pop-up box 37a allows a user to make a selection for the cell that contains the text "the insured vehicle collided w . . . " The user may choose "text" as the type of regular expression that the system may then expect for the content of this cell. A string of alphanumeric characters or related characters such as hyphens, or periods, commas or other punctuation marks would then be expected for the content of this cell and for that of corresponding cells of the remaining entries. Such a designation may describe content that is expected for the cell. For example, the cell may contain information such as policy number 33(1)a, location number 33(1)b or a loss date 33(1)c, as shown in FIG. 7A. Thus, for example, for the first cell 33(1)a, a series of three letters, a space and seven digits followed by hyphen followed by two further digits may be expected as the regular expression for the cell. By way of further example, the regular expression may be a string of a corresponding number of alphanumeric characters. For a date field, the format of a two-digit month followed by a slash followed by a two-digit day followed by a slash followed by a four-digit year may be expected as the regular expression for the content of the cell. Alternatively, a date field may expect several types of formats for the date.

Similarly, for each cell that the user creates for the entry, such a designation of a type of regular expression can be made. According to a further aspect of the disclosure, the system may guess as to the type of regular expression required for the cell by comparing the cell content with previously stored regular expression types. According to this aspect of the disclosure, this default regular expression type could be shown to the user for approval or automatically stored and used until corrected.

In addition, as shown by FIG. 11, the user can be prompted to make a designation or header describing the item or information contained in this field or cell of the table. This designation can be consistent for corresponding items of information in the remaining entries. By way of example, FIG. 11 illustrates that a pop-up box 37*b* prompts the user to name the item of information for the first entry and for all corresponding items of information of subsequent entries 33(2), 33(3) and so on. In this example, this item of information, for which as discussed, content of the RegExp type "text" will be expected, is being described as "Description" in pop-up box 37*b* because this field contains the item of information that briefly describes the event that was reported to cause the loss that is the basis for the claim. Once stored in an ingestion database, this naming or header of the item of information can aid in subsequent searching or processing for human analysis or for processing by a computer system. It will be understood that many other types of controls, including UI controls, for receiving user input in addition to or instead of pop-up boxes can be provided.

Figure 17A:
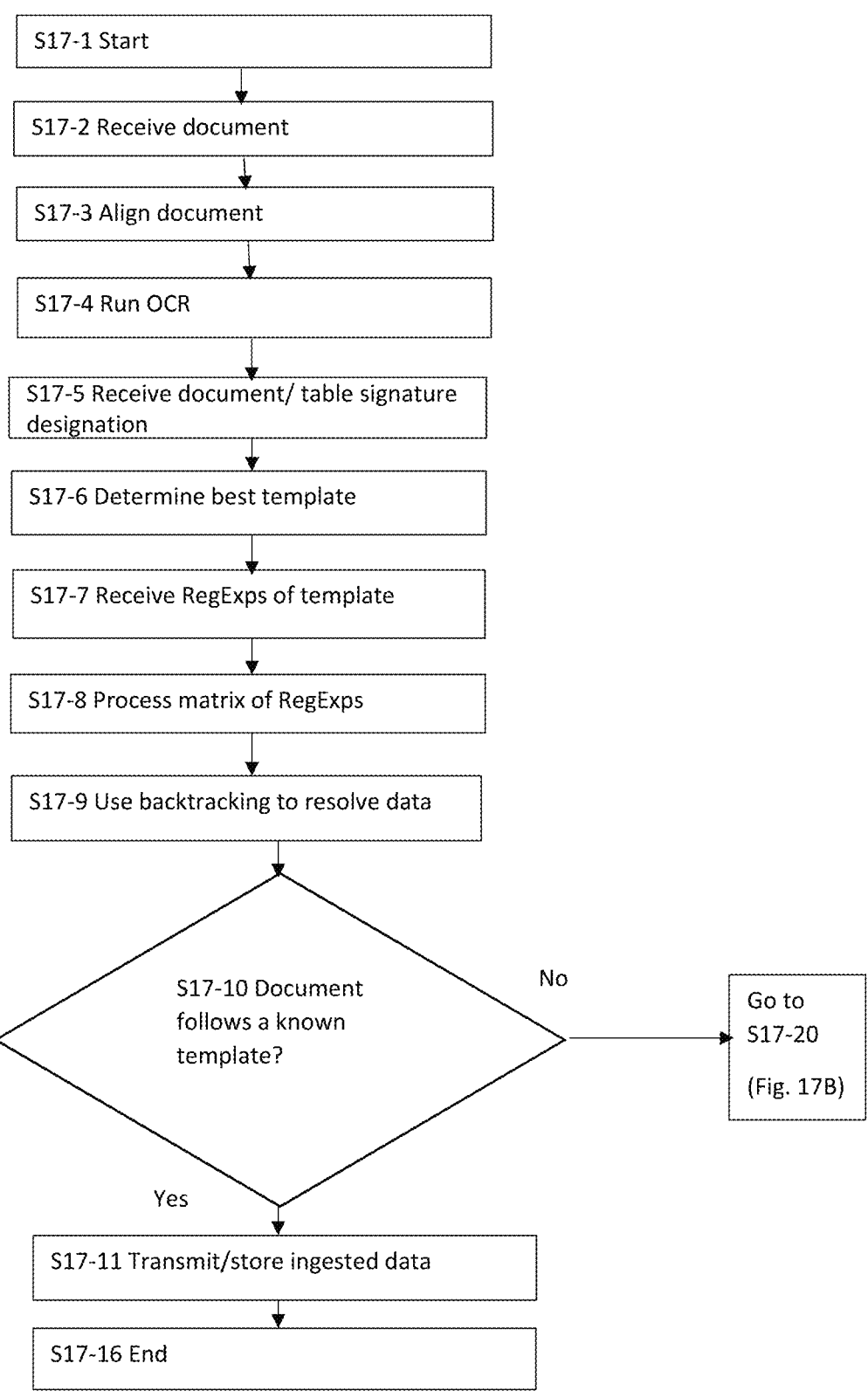
FIG. 17A shows a flowchart depicting steps of an ingestion process, in accordance with some implementations of the disclosure.
Figure 19:
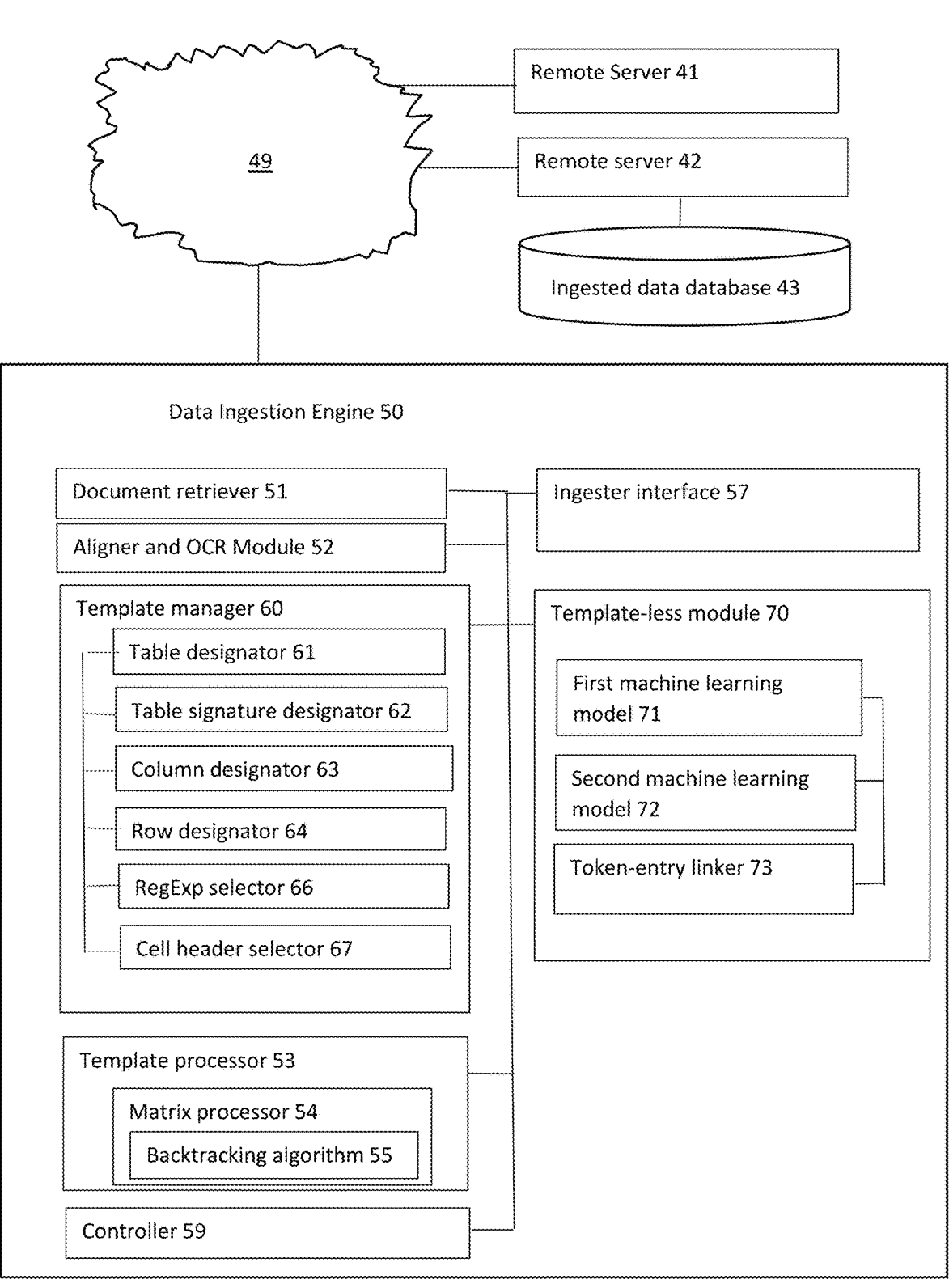
FIG. 19 shows an example of a system architecture overview of a data ingestion engine, in accordance with some implementations of the disclosure.

FIGS. 17A-17B include a flowchart depicting steps of an automated ingestion process, in accordance with some implementations of the disclosure. In the illustrated example, the automated ingestion process uses a combined template-based and template-less approach. However, it should be appreciated that in other embodiments automated ingestion can be performed by following only a template-less approach (e.g., the process illustrated by FIG. 17B) or following only a template-based approach. The automated ingestion process of FIGS. 17A-17B will be described with reference to the system architecture shown in FIG. 19, illustrating example components that can be used to implement this embodiment.

At operation S17-1, the process/system start can be initiated automatically upon receipt of an appropriate document, for example, as an email attachment. At operation S17-2, a document 30 containing a table 31 (e.g., a loss run document) is received by document retriever 51 of the data ingestion engine 50 shown in FIG. 19. For example, the document 30 can be received from a remote server 41 via a data network such as the Internet 49 or from another source shown in FIG. 19. Thereafter, the received document 30 can be automatically rotated at operation S17-3 and aligned for the orientation desired by aligner/OCR module 52. In some cases, the document 30 can already be aligned/rotated, in which case operation S17-3 can be skipped.

At operation S17-4, OCR is run to recognize alphanumeric information in the document. At operation S17-5, a designation of a document/table signature (e.g., document signature 31*a*) is received by document/table signature designator 62 of template manager 60. This document/table signature designation can be information or text that is consistent throughout the table 31 and does not vary across entries.

At operation S17-6, a template processor 53 determines whether the table follows a known template from a previous document. For example, document identifying information (e.g., a carrier) can be extracted from the header information near a beginning or top of the document to identify or predict a document type. A determination can be made as to whether this identified document type follows the same format as other documents (e.g., other loss run documents) having the same document type. According to some implementations, the document identifying information (e.g., words) of the received document can be extracted as the document signature of the received document, and the extracted document signature can be matched against the document signatures of existing templates, which may have been the document signatures of previously processed documents. The best matching template is used for the template-based data ingestion process of the current document.

By way of example, FIG. 7A shows an example of a document signature 31*a*. Some or all of the words shown as bordered can constitute the document signature. A further example of a document whose document signature can be compared is shown in FIG. 7B. This document can be matched against previously stored document template masks depicted in FIGS. 7C and 7D. According to an aspect of this embodiment, words corresponding to the document signature of the document shown in FIG. 7B can be compared against the previously stored document template masks shown in FIGS. 7C and 7D to find the best matching signature, where the document template mask masks the tokens that are not part of the template signature. This process can be performed as follows: a match score can be defined as a function of the longest matching subsequence between a template's signature and the words of the signature of the instant document shown in FIG. 7B that the system is trying to match. As a result, any template that shares at least one word with the incoming loss run could be a candidate, while the best possible match could be a template whose entire document signature is a subsequence within the incoming document/loss run. Based on this match scoring technique, the system can assign a match score to each template, and the template having the best match score can be selected. For example, the system can find that the document shown in FIG. 7C has a score of 41.0, while the document shown in FIG. 7D has a score of 18.2. Accordingly, the system can determine that the document shown in FIG. 7C to be the best matching document template for the document shown in FIG. 7B, and the template-based ingestion process could be attempted for the document under consideration using the template illustrated by FIG. 7C.

At operation S17-7, a regular expression expected for the content of each cell/field in the table is received for each cell by RegExp selector 66 of template manager 60, according to the previously defined template that was found as the most closely matching candidate template, as described above. FIG. 12 illustrates the representation of the data extracted by the system as delineated in the columns and rows. The system consolidates these items of information, as shown in FIG. 13, so that each entry is shown on a single row with the columns correctly identified. FIG. 14 illustrates a table after extraction of the information, such that the items of information are grouped in rows, one row for each entry, according to the delineation of entries and the delineation of columns earlier on.

At operation S17-8, a matrix of regular expressions is processed for the entries of the table 31 by matrix processor 54. The matrix processor 54 moves through each consecutive cell of each consecutive entry expecting the corresponding regular expressions for each field designated for the corresponding cell according to the template.

In some implementations, when parsing the data, if the type of data for a cell (target cell) is encountered that contains an item of information that is inconsistent with, or does not conform to, the regular expression (target expression) expected for that item of information, then at operation S17-9 a backtracking algorithm can be employed to find the correct item of information for the target cell. According to the backtracking algorithm, the system can backtrack to the most recent cell that contains an ostensibly correct item of information. That is, the system returns to the most recent cell that contains an item of information that does conform, or is consistent with, the regular expression that is expected for it as defined by the template. Then the system reassigns to the target cell data immediately adjacent (before or after) the data that was previously assigned to the target cell to determine whether it is of the expected RegExp type. If the newly assigned data is of the expected RegExp type, then the target cell can be deemed to contain the appropriate data. If the newly assigned data is still not the RegExp type, then additional data immediately adjacent data, before or after the target data, may be tried, or a portion of the data that was part of the target data may be excluded from the target cell. In this way, one or more additional attempts may be made to re-align the target data with the target cell to arrive at target data that is the expected data content for the target cell based on the RegExp expected according to the RegExp earlier selected.

FIGS. 26A-26G depict an example application of a backtracking algorithm, in accordance with some implementations of the disclosure. FIG. 26A depicts an original loss run document 2600 and a configured RegExp table 2610. FIG. 26B shows that the first RegExp row 2621 correctly matches the first line 2620 of the claims table, outlined with a box. FIG. 26C shows that using the same RegExp row 2621 that matched the first line 2620 does not match the second line 2630 of the claims table, outlined with a box. FIG. 26D shows that second RegExp row 2622 correctly matches the second line 2630. FIG. 26E shows that using the second RegExp row 2622 also matches the third line 2640, OWNED AUTO (outlined with a box), which is a spillover of the second line 2630. FIG. 26F shows that using the second RegExp row 2622 fails to match the fourth line 2650, outlined with a box. FIG. 26G shows that using the third RegExp row 2623 matches the fourth line 2650.

FIG. 15 illustrates an example of schema mapping by the system in accordance with the designations for the content of various cells entered earlier. Entries 33(1), 33(2), 33(3) and so on have been correctly assigned based on the schema mapping. To do this, the items of information contained in each field have to be reconciled with the type of data designated for each cell. FIG. 16 illustrates the matrix of regular expressions that are expected by the system. The first row of the four rows of each claim or entry in the example shown in FIG. 16 contains a different subsets of items of information than the remaining three rows, which contain only dollar amounts.

However, it may be determined that data picked up in a field is inconsistent with the regular expression expected for the cell. In this case, at S17-9 a backtracking algorithm 55 of template processor 53 shown in FIG. 19 may be used to return to the most recent cell containing data consistent with the regular expression expected for the cell and then to regroup the following data for the target cell. Thus, the following data may be re-read as part of the target cell, or a portion of the following data may be excluded from the following cell. It is then again checked whether the newly assigned data is consistent with the regular expression expected for the target cell. If so, processing moves to S17-11. In this way, one or more additional attempts are made to regroup the following data by including adjacent data or by excluding part of the data from the target cell.

Depending on the complexity of the form and the regularity with which the data contained in each entry follows the format for the table 31, many such pieces of data may be problematic and be inconsistent with the regular expression expected for the cell. Thus, the backtracking algorithm 55 may have to return on a number of occasions and/or for a number of target cells through the parsing of the table 31 until data of an expected type are obtained from the cell, and then processing resumes. The process can continue until all the data in cells is extracted.

At operation S17-10, it is determined whether the document can be processed using the best candidate. If the items of information extracted from this document can be processed using the sequence of RegExp determined as the best candidate template for this document, then template-based processing continues to S17-11. On the other hand, if it is determined that this document cannot be processed using the sequence of RegExp for the template (e.g., repeated backtracking attempts to resolve the data in a field are required), then at operation S17-10 it is determined that the previously stored templates cannot be used for this document and processing continues with a template-less machine-learning based approach illustrated by FIG. 17B. At operation, S17-11, the extracted data is stored and/or transmitted by ingester interface 57. For example, extracted data can be transmitted to remote server 42, which may store the extracted data in an ingester database 43 shown in FIG. 19. At operation S17-16, the processing ends.

In some implementations, if a best template cannot be determined at operation S17-6 within a sufficient matching threshold, operations S17-7 through S17-9 can be skipped and at operation S17-10 it can be determined that the previously stored templates cannot be used for this document and processing continues with a template-less machine-learning based approach illustrated by FIG. 17B.

JSON is a data format that can be used as the format for the data and to store the data of the template. Tables to be processed in the future that conform to this template can then be processed using the same template without the need to create the same template. For example, a user or the system may note that the table follows a format previously templated. In such a case, the template could be re-used and there would be no need to select a regular expression and a description for each cell of the first entry.

A template-less process is also contemplated according to the machine learning embodiment of the disclosure. According to an aspect of the disclosure, the machine learning based process may be used when the best previously used template cannot be used for the document, as shown in operation S17-10. According to this aspect of the disclosure, the machine learning based approach could be used when the template-based data extraction method is not practical or impossible in real time because no suitable template is found to match the format of the document.

This template-less, machine learning embodiment can also include steps similar to the first embodiment using the template-based approach illustrated in FIG. 17A for receiving the document at operation S17-2, aligning the document at operation S17-3 and running OCR software at operation S17-4 to recognize data in the document. However, if it is determined at operation S17-6 that the table does not follow a template known to the system and/or backtracking cannot be used to resolve inconsistent data during processing with a template, then the machine learning based approach can be implemented as shown in FIG. 17B. It is noted that the present disclosure contemplates that the machine learning-based, template-less approach may be utilized at the outset without running the template-based approach described above.

FIG. 19 illustrates a template-less module 70 as part of the data ingestion engine 50. According to the present embodiment, the template-less module 70 can include, by way of illustration, a first machine learning model 71, a second machine learning model 72, and token-entry linker 73.

A process for template-less ingestion will now be described with reference to FIG. 17B. A document as shown in FIG. 20 can be processed. In some implementations, the raw input to the templateless ingestion process can be a page that can be received in a pdf or a number of image file formats (e.g., raster graphics file format such as png, jpeg, etc; and/or vector file format, including PDF). Depending on the models (further described below) that are utilized, the page can pre-processed into different input formats.

Figure 21B:
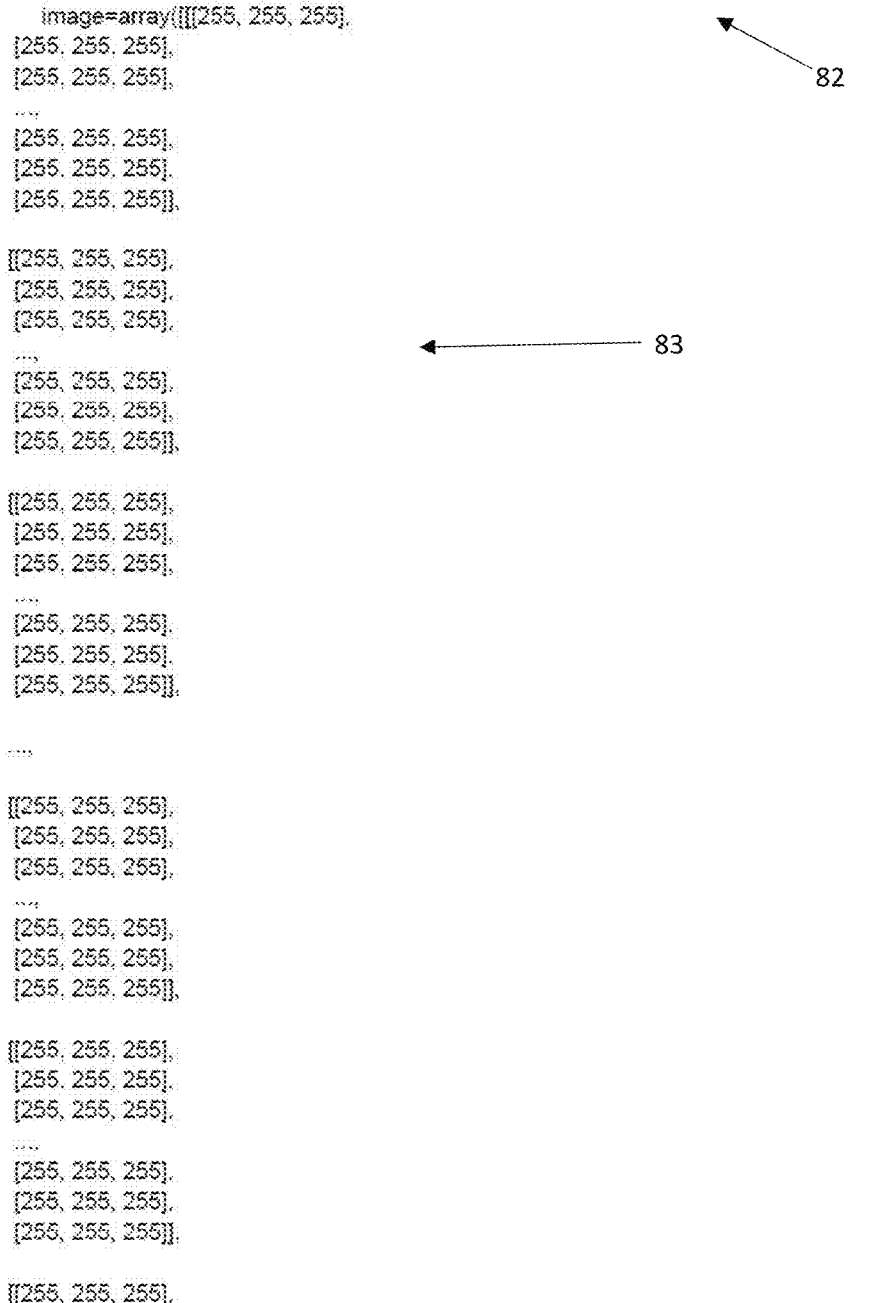
FIG. 21B shows an example of OCR data recognized from the document shown in FIG. 20, in accordance with some implementations of the disclosure.

At operation S17-19, input data is obtained for the template-less ingestion process, the input data comprising items of information or tokens contained in the document, the location (e.g., coordinates) of the items of information or tokens, and a numerical representation of the image corresponding to the document. For example, FIGS. 21A-21C depict an example of the data inputs obtained based on the synthetic data in the table shown in FIG. 20. In this example, the data includes items of information or tokens 81 (illustrated in FIG. 21A), the location (e.g., coordinates) of the items of information 82 (illustrated in FIGS. 21A-B), and numerical representation of first and last pixels of each channel of the input image 83 (illustrated and FIGS. 21B-C). The coordinates 82 may define a bounding box signifying the corners or vertices of the field in the document from which the items of information were extracted.

In some implementations, an OCR engine can be used to extract the tokens and corresponding locations. For example, the OCR engine can output bounding box coordinates associated with each token. In some implementations, the document image can be converted into a standardized numerical input represented as a 3-d vector of dimension W×H×3, where W and H represent the width and height of the document image and 3 represents the 3 channels for the pixels of the image.

At operation S17-20, these three inputs are provided to the first machine learning model. The first machine learning model may be a Bidirectional Encoder Representations from Transformers (BERT), which is a transformer-based machine learning technique for natural language processing (NLP). This first machine learning model may have an architecture that combines a transformer and a convolutional neural network (CNN) architecture.

In some implementations, the first machine learning model can be pre-trained using large numbers of two-dimensional documents with text that is arranged in tables or in other two-dimensional layouts. For example, in some implementations the first machine-learning model can be pretrained using millions of two-dimensional insurance documents with text that is arranged in tables or in other two-dimensional layouts. In some implementations, the first machine learning model is pre-trained with input weights using a number of unlabeled scanned document images. These document images can be application specific as described above, and they may provide rich information to the model during pre-training about the language, 2D layout, and relationships between them, in insurance documents. Particular techniques for pre-training the first model with input weights are further described below.

In addition, the first machine learning model can be fine-tuned, after pre-training, to classify the items of information or tokens. This can entail using a type of classification system that is employed for the specific type of items of information that appear in the document from which the data is to be extracted. For example, in the case of a document with a loss run, an extraction schema can be defined for the items of information in fields commonly seen in such documents, including, by way of example: Document producer (the company or insurance carrier that generated the loss run); loss run start date (the beginning date of the period from which the loss run includes insurance claims); loss run end date (the end date of this period), policy number (identification number of a particular insurance policy); policyholder name (the name of the person, company or other entity that is the policyholder); line of business (the line of business or the type of coverage under which the policy was taken); claim number (the ID number of event that is the subject of the insurance claim); claimant name (the name of the person who filed the claim); loss date (the date of occurrence of the event that is the subject of the claim); open date (the date that this event was first reported); close date (the date this claim was closed, if it was closed); claim status (the status of this claim, typically either open or closed); claim description (a brief description of the event that is the subject of the claim); accident location (the location of this event); total paid amount (the amount paid by the insurer, including paid expenses); total reserve amount (the amount to be set aside by the insurer in preparation for further payments related to this claim); total incurred amount (paid amount plus reserved amount minus recoverable amount—the definition of this term may vary from carrier to carrier, or even the same carrier may define it slightly differently from loss run to loss run).

Specific techniques for training and fine-tuning the first machine learning model are further described below.

At operation S17-21, based on the three types of input: i) items of information or tokens, ii) the coordinates of the items of information, and iii) a numerical representation of the document image, the first machine learning model can be used to generate, for each token/item-of-information, a prediction indicating a classification of the item-of-information. For example, the first machine learning model can produce a probability distribution over multiple classes, from which taking the maximum probability class assigns a class to each item of information according to an extraction schema previously trained for the machine learning model. Such a probability distribution showing the most likely candidates is illustrated by way of example in FIG. 22. In the illustrated example, the classification task is structured as a sequence tagging task, where in addition to predicting each of the classes e.g., "Line of Business", "Policyholder Name", "Loss Run Start Date", "Claimant Name", etc., for each item of information, three tags may also be predicted, as follows:

B—beginning of a sequence

I—inside of a sequence

O—same as Other

As an example, if a loss run document contains the text "Mark Lloyd Smith driver", then the correct predictions by the model for these four tokens or items of information would be:

"Mark"→B—Claimant Name,
"Lloyd"→I—Claimant Name,
"Smith"→I—Claimant Name,
"driver"→O
because "Mark" begins the full token sequence that corresponds to the Claimant Name, "Lloyd" and "Smith" are inside the sequence, and "driver" is not in the classification mapping at all.

According to the process of FIG. 17B, a second machine learning model is used to obtain the location/coordinates of each entry/record of the document. To this end, at operation S17-22, the numerical representation of the image is transmitted as input to the second machine learning model. The second model can take as an input the same numeric representation of the image as the first model. For example, the document image can be converted into standardized numerical input represented as a 3-d vector of dimension W×H×3, where W and H represent the width and height of the document image and 3 represents the 3 channels for the pixels of the image As indicated at operation S17-23, the prediction output of the second machine learning model includes the locations of entries in the document image, each entry including one or more rows. Each location can be indicated as a set of four coordinates indicating the corners (vertices) of a bounding box of the entry. As discussed above, each entry or record can include one or more rows of the table. On the other hand, it will be appreciated that entries or records may be arranged such that each record or entry includes one or more columns of the table.

According to some implementations, the second machine learning model can be an object detection model that includes transformers. For example, the second model may be, or be based on, DETR (DEtection TRansformer). DETR architecture includes a transformer with a convolutional neural network backbone that learns a two-dimensional representation of an input image, which is then flattened and is supplemented with positional encoding before it is passed into the transformer encoder and the transformer decoder. However, it should be appreciated that other types of object detection architectures can be used for detecting the coordinates of entries or records of the table.

It should be appreciated that machine learning architectures other than those described above may be used for the first machine learning model and/or the second machine learning model.

At operation S17-24, items of information with coordinates above the first entry (e.g., first predicted claim row) would be considered page-level or summary items of information relevant to the table/document as a whole. The remaining items of information can be assigned to their respective entries. By virtue of implementing this operation, page-level information that appears in the summary section of a document can be differentiated from information that is specific to a row or section of the document/table. For example, page-level information that appears in the summary section of a loss run document can be disambiguated from claim-level information that appears in the claim section. This is illustrated by FIG. 23. For example, in implementations where the method is applied to a loss run document, after all of the tokens are classified and the claim rows are predicted, this operation can be run to disambiguate page-level (or summary) vs claim-level.

At operation S17-25, each token/item-of-information (determined using the first model) is linked to an entity (determined using the second model) by mapping the locations (e.g., coordinates) of the tokens to the locations (e.g., coordinates) of the entries. For example, the intersection of the area defined by the coordinates of each item of information with the area defined by the coordinates of each entry can be compared, and the amount of overlap can be scored. The entry with the highest overlap (e.g., in cases where there is more than one entry that overlaps) can be assigned that item of information. An entry with n items of information and a series of m entries may necessitate a matrix n×m. The normalized area intersection score for each pair of entry-item information would be determined. Items of information can then be assigned to entries according to the highest score.

At operation S17-26, a formatted data table is generated with each entry and its token(s) as a single data record of the table. For example, a claim level table as shown in FIG. 23 can be generated such that each row represents one entry. As discussed above, a JSON file format may be used to store and to transmit the data objects thus created to the database that houses the ingested information. However, it should be appreciate that other types of file formats may be used instead of, or in addition, to JSON.

At operation S17-27, the information or file can be transmitted via network 49 to server 42 for storage in ingested data database 43.

Construction of First Model

Figure 24:
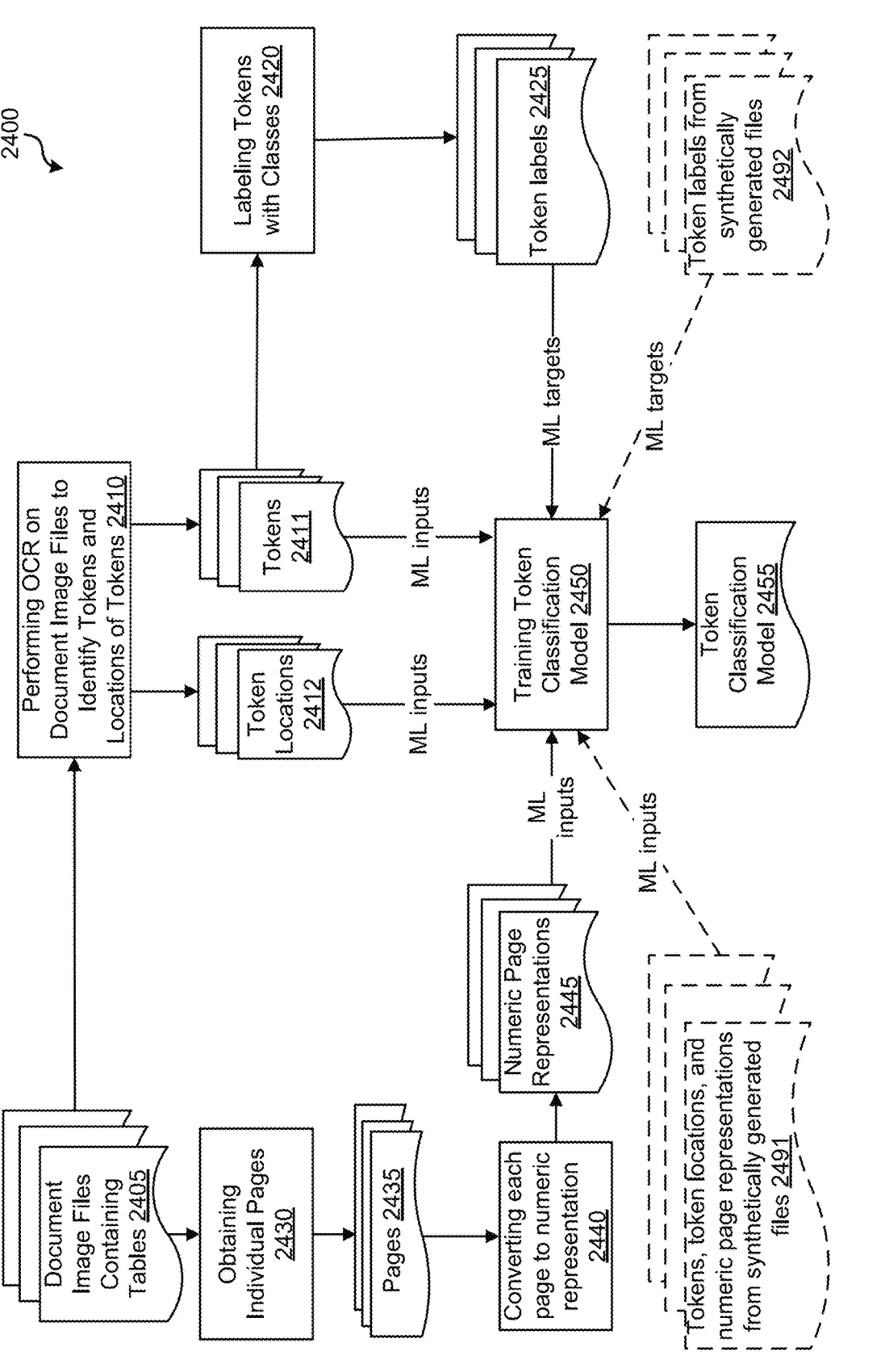
FIG. 24 is an operational flow diagram illustrating an example method of building a token classification model from a dataset of document image files containing tables, in accordance with some implementations of the disclosure.

FIG. 24 is an operational flow diagram illustrating an example method 2400 of building a token classification model 2455 (i.e., a first model as described above) from a dataset of document image files 2405 containing tables, in accordance with some implementations of the disclosure. The document image files 2405 can be existing loss runs files or other documents files having complex formats, including one or more tables of entries. The document image files 2405 can include hundreds, thousands, millions, or even more documents stored in any number of formats such as pdf, jpeg, png, tiff, etc. In some implementations, the files may all be converted to the same format or otherwise standardized prior to performing the operations described herein.

Operation 2410 includes performing OCR on the document image files 2405 to identify tokens 2411 and their corresponding locations 2412 on each page of the document image files 2405. The OCR engine can generate OCR'd document image files, for example, in a JavaScript Object Notation (JSON) format or Extensible Markup Language (XML) format. A suitable OCR engine (e.g., open source or otherwise) can be used to extract the tokens 2411 and corresponding token locations 2412. The OCR engine can output bounding box coordinates (e.g., four coordinates) identifying a location of each token on a given page. For example, FIG. 21A depicts an example of tokens and bounding box components (bboxes) that can be extracted from a loss run using an OCR engine.

Operation 2420 includes labeling the tokens with categories/classes to obtain token labels 2425. Each token can be tagged with a category/class label using a schema pertinent to the document type. For example in the case of a loss run, a schema may including classes such as a document producer, loss run start date, loss run end date, policy number, policyholder name, etc. Other example classes that can be used to categorize tokens in a loss run are illustrated with respect to FIG. 22. In some implementations, a GUI can be presented to a user to manually tag (e.g., adding category labels such as "policy holder name") each token. A user may utilize one or more user interface controls or tools for adding category labels. If a token does not belong to a specific class, it can be left unlabeled, in which case it can be inferred to be "other" when annotations are processed.

Operation 2430 includes obtaining individual pages 2435 from the document image files 2405. For example, document files 2405 in the form of image packages (e.g., PDF of images) can be converted into page-wise images of fixed shape and resolution. In some implementations, the set of files 2405 may already be page-wise images, and this operation can be skipped. Operation 2440 includes converting each page to a numeric page representation 2445. Each image can be converted into a standardized numerical input represented as a 3-d vector of dimension W×H×3, where W and H represent the width and height of the document image and 3 represents the 3 channels for the pixels of the image, which, for example, is represented in the image component of the example input in FIG. 21A.

Operation 2450 includes training the token classification model 2455 based on a training dataset including an input dataset and a target dataset. The input training dataset can include at least some of the tokens 2411, token locations 2412, and numeric page representations 2445. The target training dataset may include at least some of the token labels 2425. In some implementations, the input and/or target datasets can be further standardized prior to model training. Model training, in some implementations, can include: running a model training pipeline that tunes a pre-entry model against the labeled data set using gradient descent with cross entropy loss as the loss function.

The token classification model can be based on the LayoutLMv2 architecture that includes a multi-modal transformer that accepts inputs of three modalities: text, image, and layout, which can correspond to the three inputs described above. The input of each modality can be converted to an embedding sequence and fused by the encoder, thereby integrating it in the transformer architecture's first input layer. In this way, the model can learn cross-modality interaction among text, layout, and image in a single multi-modal framework. A spatial-aware self-attention mechanism can be integrated into the transformer architecture such that the model may fully understand relative positional relationships among blocks of text or items of information.

In some implementations, the training dataset can optionally be enhanced with synthetically generated data. This optional data is illustrated in dashed lines as the tokens, token locations, and numeric page representations 2491 from synthetically generated files (additional input dataset); and token labels 2492 from synthetically generated files (additional target dataset). For example, where token classification model 2455 is trained on loss runs, two different kinds of data can be used for training: labeled loss runs that comprise real loss runs that have been labeled by humans manually to denote the token classes for the token classification model, and machine-generated loss runs. The machine-generated loss runs can be generated by a loss run generator system, and programmatically track the location of both tokens in the extraction schema and claim rows that are used for training the model. Labels can be assigned programmatically to the synthetic dataset during the generation process rather than through manual annotation. While real-actual loss runs may be most representative of the data the system is deployed against, only a limited number may be acquirable due to the limited availability of the real dataset and/or the limitations of manual labeling. As such, the training dataset can be scaled, as needed, using generated files.

Pretraining First Model

Figure 27A:
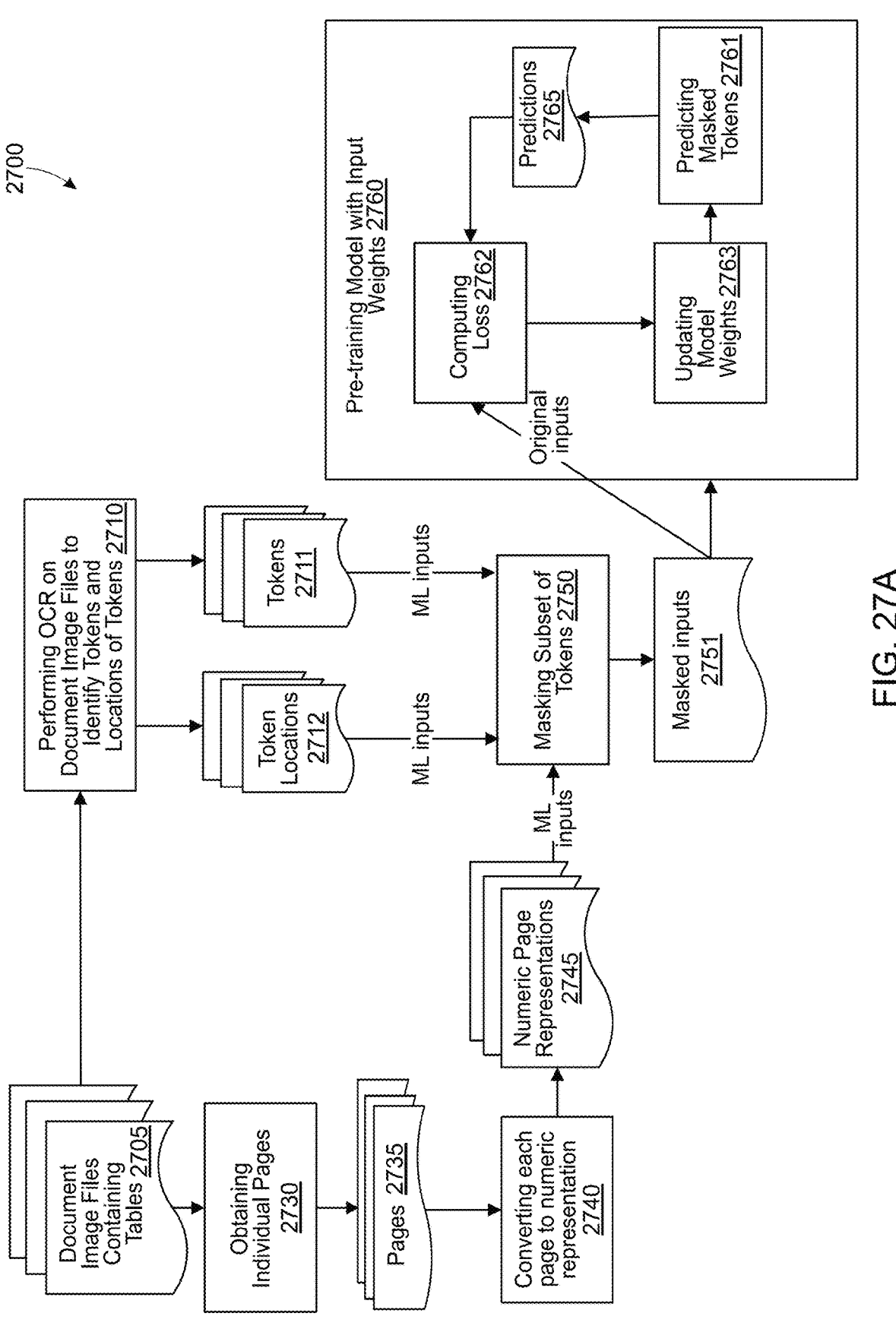
FIG. 27A is an operational flow diagram illustrating an example method that includes a process of pre-training a token classification model with input weights, in accordance with some implementations of the disclosure.

In some implementations, prior to constructing/training the token classification model, the token classification model can be pretrained with input weights using a Masked Language Modeling (MLM) process. To this end, FIG. 27A is an operational flow diagram illustrating an example method 2700 that includes a process 2760 of pre-training a token classification model with input weights, in accordance with some implementations of the disclosure. As depicted, method 2700 can be implemented using a dataset of document image files 2705 containing tables, in accordance with some implementations of the disclosure. The document image files 2705 can be similar to the previously described document image files 2405. For example, files 2705 can include existing loss runs files or other documents files having complex formats, including one or more tables of entries, that are in any number of formats such as pdf, jpeg, png, tiff, etc. In some implementations, files 2705 and 2405 may be partitioned from the same original set of files. For example, a first set of files 2705 can be designated for pretraining, and another set can be designated for final model construction/training. In some implementations, the files 2705 may all be converted to the same format or otherwise standardized prior to performing the operations described herein.

As depicted, operation 2710 includes performing OCR on the document image files 2605 to identify tokens 2711 and their corresponding locations 2712 on each page of the document image files 2705. The OCR engine can generate OCR'd document image files, for example, in a JSON format or XML format. A suitable OCR engine (e.g., open source or otherwise) can be used to extract the tokens 2711 and corresponding token locations 2712. The OCR engine can output bounding box coordinates (e.g., four coordinates) identifying a location of each token on a given page.

Operation 2730 includes obtaining individual pages 2735 from the document image files 2705. For example, document files 2705 in the form of image packages (e.g., PDF of images) can be converted into page-wise images of fixed shape and resolution. In some implementations, the set of files 2705 may already be page-wise images, and this operation can be skipped.

Operation 2740 includes converting each page to a numeric page representation 2745. Each image can be converted into a standardized numerical input represented as a 3-d vector of dimension W×H×3, where W and H represent the width and height of the document image and 3 represents the 3 channels for the pixels of the image Operation 2750 includes masking a subset of the tokens 2711 to generate masked inputs 2751. The masked inputs can include inputs containing both masked and unmasked tokens, as well as token locations 2712 associated with the tokens. Operation 2760 includes pre-training, using the masked inputs 2751, the token classification model 2760. To this end, a MLM process can be implemented. During the MLM process, a random subset of tokens 2711 can be masked for a masked language model to later predict the masked tokens. The percentage of masked tokens can vary, but it can be set to optimize the tradeoffs between masking more tokens (e.g., to improve training efficiency) and masking fewer tokens (e.g., leaving sufficient context to learn adequate representations). In a particular implementation, about 15% of tokens can be masked.

Figure 27B:
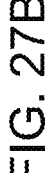
FIG. 27B illustrates an example of a masked input, including masked tokens, and a prediction of the masked tokens that can be generated by implementing operations of FIG. 27A.

Of the masked tokens, a first plurality can be replaced by a [MASK] token, a second plurality can remain as the original token, and a final third plurality can be substituted by a randomly sampled token from the text vocabulary of the model. In some implementations, the majority of the masked tokens are replaced by the [MASK] token while small minorities remain as the original token or are substituted by a randomly sampled token from text vocabulary of the model. For example, in one particular implementation about 80% are replaced by a special [MASK] token, while 10% remain as the original token, and the final 10% are substituted by a randomly sampled token from the text vocabulary of the model. By way of illustration, FIG. 27B illustrates one example of masked inputs 2751 that include some masked tokens.

Following masking, process 2760 includes pre-training the model with input weights. To this end, model weights can be initialized and thereafter optimized by iteratively performing operations 2761-2763. Operation 2761 includes predicting the masked tokens to generate predictions 2762. Operation 2763 includes computing a loss by comparing the predictions 2762 with the actual masked inputs 2751. Operation 2763 includes updating the model weights based on the computed loss. Any suitable loss function can be utilized during process 2760 to generate optimal model weights, and process 2760 can iterate for a predetermined number of iterations and/or until a loss function is optimized (e.g., by finding a local minima or global minima). During operation 2762, the model can attempt to predict the tokens that have been masked, using the context and token locations of the unmasked tokens. In doing so, rich representations between the entities in these documents can be generated by using the text, locations of said text, and general 2D structure of each page. By way of illustration, FIG. 27B illustrates one example of predictions 2765.

It should be noted that the same model architecture can be used for pre-training and token classification. After pre-training, a classification head can added to the model to enable use of the model for multi-class classification, but the model architecture beneath the classification head can be the same.

During pre-training, the utilization of application-specific documents can result in a unique configuration of model weights that differ from generic initial or open weights, and can result in increased representation learning by the first/token machine learning model of the patterns that specifically appear in the business data most relevant to the downstream use-case. For example, the understanding of data in loss run documents can be better captured through this pre-training process, which can result in an increase in performance metrics.

A further advantage of pre-training the token classification model that can be appreciated from the foregoing description is that it does not depend on labeling the tokens. By running OCR to obtain the text, masking some of the text, and attempting to predict the masked text, the token classification model can be pre-trained without any labels.

Construction of Second Model

Figure 25:
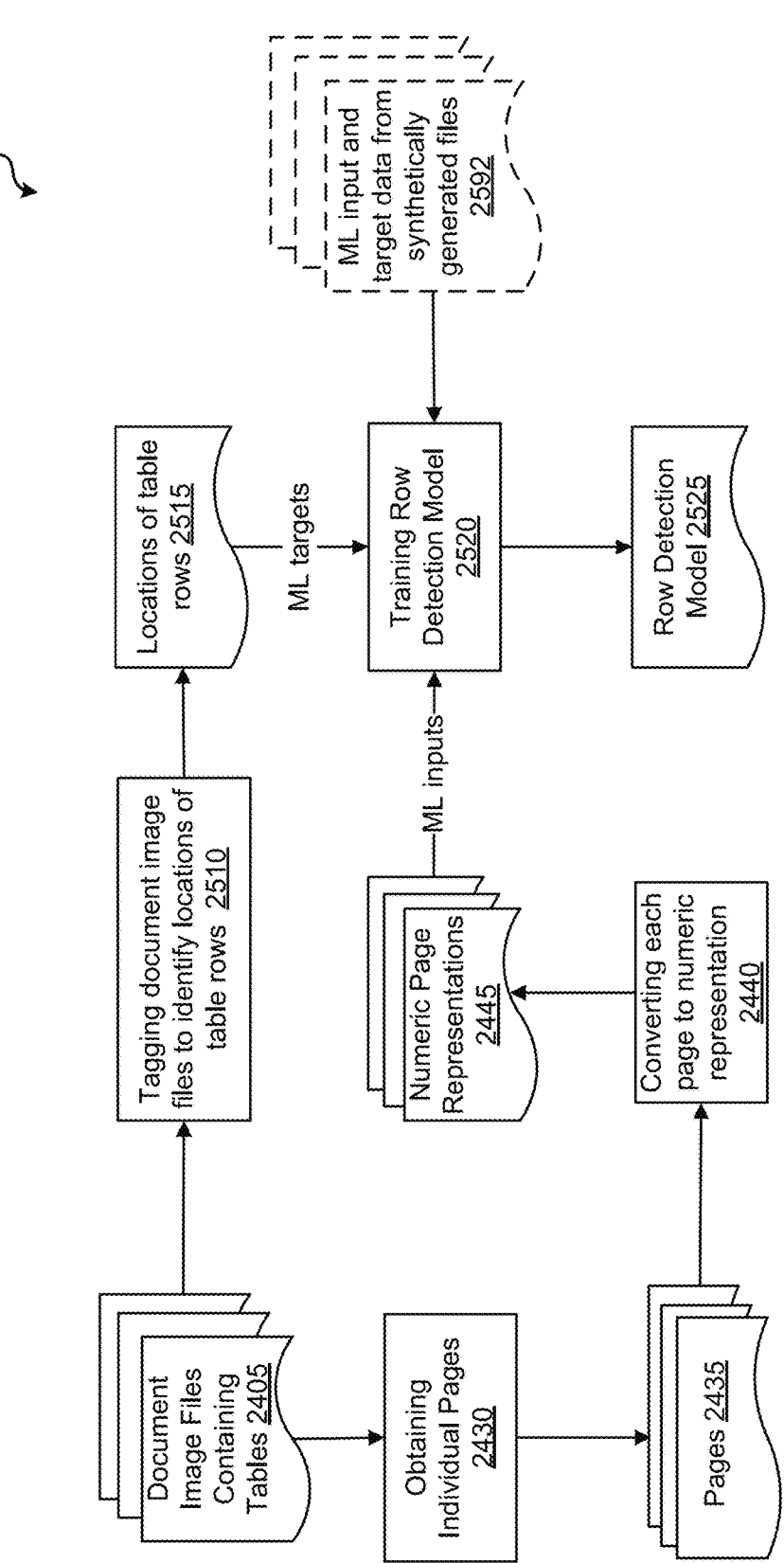
FIG. 25 is an operational flow diagram illustrating an example method of building a row detection model from a dataset of document image files containing tables, in accordance with some implementations of the disclosure.

FIG. 25 is an operational flow diagram illustrating an example method 2500 of building a row detection model 2525 (i.e., a second model as described above) from a dataset of document image files 2405 containing tables, in accordance with some implementations of the disclosure. For example, given an input image of a loss run, the model 2525 can be configured to predict the locations of any claim rows in the image. The output of the model 2525 can be zero or more row boxes (e.g., claim row boxes), where each box consists of a set of bounding box coordinates that denote the position of the box on the page.

As depicted, the document image files 2405 may be the same files used to build the token classification model 2455. Operation 2430 for obtaining individual pages 2435 (if this operation is needed), and operation 2440 for converting the pages to numeric page representations 2445 may be performed in a manner similar to that described above with respect to method 2400. That is, the row detection model 2525 can be configured to use the same 3-d numerical representation of the image as described for the token classification model.

Operation 2510 includes tagging the document image files 2405 to identify locations 2515 (e.g., coordinates) of table rows in each image. For example, where the documents are loss runs, the location of each claim row can be identified. A GUI can be presented for a user to hand tag (e.g., by drawing bounding boxes) scanned documents. A user may utilize one or more user interface controls or tools for drawing bounding boxes and/or otherwise specifying the locations of rows.

Operation 2520 includes training the row detection model 2525 based on a training dataset including an input dataset and a target dataset. In this case, the row detection model 2525 can be trained to extract features from an input page image, and output a target prediction of the location (e.g., bounding box expressed as coordinates) of each location in the image that contains a row (e.g., claim row). As alluded to above, the row detection model can be trained as an object detection model that includes transformers. For example, the model 2525 can be based on the DETR architecture.

In some implementations, the training dataset for the row detection model can optionally be enhanced with synthetically generated data, illustrated in dashed lines as ML input and target data 2592 from synthetically generated files (additional input and target datasets). For example, where row detection model 2525 is trained on loss runs, two different kinds of data can be used for training: labeled loss runs that comprise real loss runs that have been labeled by humans manually to denote the locations of claim rows for the row detection model, and machine-generated loss runs. The machine-generated loss runs can be generated by a loss run generator system, and programmatically track the location of claim rows that are used for training the model. In some implementations, the same machine-generated loss runs used to scale the training dataset for training the token classification model can be used to scale the training dataset for training the row detection model.

Figure 18:
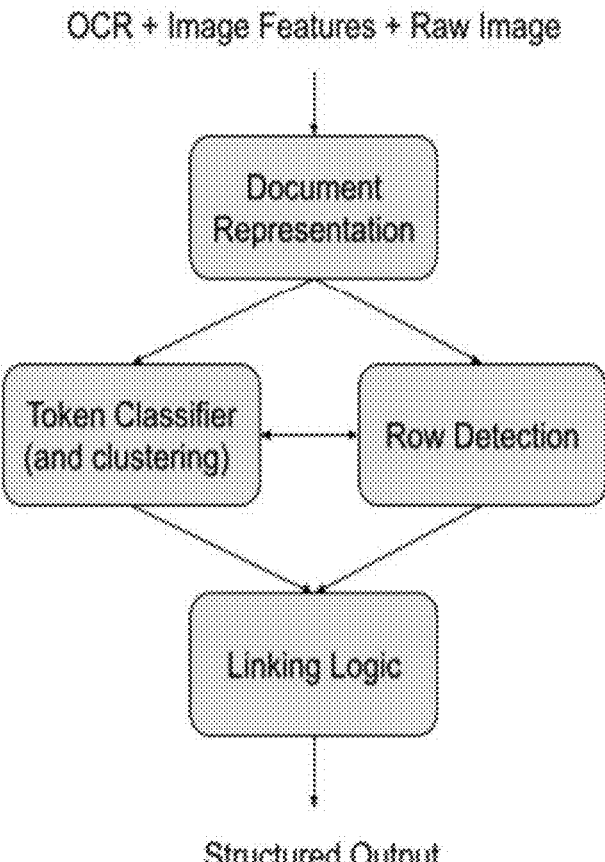
FIG. 18 shows an overview of an example of a template-less machine learning based ingestion process, in accordance with some implementations of the disclosure.

As noted above, during operation, the outputs of the two models can be processed and synthesized by linking logic to generate a final output of the system. For example, in the context of loss runs, the output can include a page-level summary information in the loss run that is not associated with claim rows, and zero or more claim rows that contain a number of claim-specific fields as denoted in the classification schema. An example output of the linking logic is shown in FIG. 23. An example of the execution flow of the two models and the linking logic is shown in FIG. 18.

Accordingly, a method, system, device, machine-readable non-transitory medium storing instructions executable by a hardware processor, and the means for providing such a method are described for ingesting large volumes of information, with documents often spanning many pages, or with more than one document following different formats, according to a template-based embodiment and according to a template-less embodiment. An improved computer system is thus achieved because often large numbers of reviewers and data entry personnel would be needed to review, analyze, and extract information from lengthy, tedious documents, and then entering each item for each entry of a ledger, such as a loss run document, into a system in a way that is readily reviewable and usable by a human or by a computer system in analyzing the information extracted. In addition, information stored in a legacy data archive of hundreds or thousands of pages may be ingested and processed far faster and with greater efficiency and accuracy according to the disclosure herein provided. Important information trapped in paper records in various archives or on legacy computer systems may thus be salvaged and used.

Although the present disclosure has been described in relation to particular embodiments thereof, many other variations and modifications and other uses will become apparent to those skilled in the art. Structures shown or described as being part of the same machine or system may be provided on separate machines or systems. For example, processes described as being performed by a server may be performed by a rack of servers or by servers at different locations remote from each other. Structures or models shown or described as being remote from each other, or as being provided as part of separate or different machines or systems, may be provided as part of the same machine or system. Structures or models shown as being linked or connected may be logically or communicatively connected and need not necessarily be physically connected or connected through wires. Steps outlined in sequence need not necessarily be performed in sequence, not all steps need necessarily be executed, and other intervening steps may be inserted. It is preferred, therefore, that the present invention be limited not by the specific disclosure herein.

In this document, the terms "machine readable medium," "computer readable medium," and similar terms are used to generally refer to non-transitory mediums, volatile or non-volatile, that store data and/or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The term "and/or," may be understood to mean "either or both" of the elements thus indicated. Other elements may optionally be present unless excluded by the context. Terms such as "first," "second," "third" in the claims referring to a structure, module or step should not necessarily be construed to mean precedence or temporal order but are generally intended to distinguish between claim elements.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

It should be appreciated that all combinations of the foregoing concepts (provided such concepts are not mutually inconsistent) are contemplated as being part of the inventive subject matter disclosed herein. In particular, all combinations of claimed subject matter appearing in this disclosure are contemplated as being part of the inventive subject matter disclosed herein.

27

What is claimed is:

1. A non-transitory computer-readable medium having executable instructions stored thereon that, when executed by a processor, causes the processor to perform operations comprising:

obtaining a first digital image of a first document containing multiple fields spatially arranged along multiple dimensions, the multiple fields corresponding to locations of alphanumeric data within the digital image of the first document;

using an optical character recognition (OCR) engine to perform:

determining multiple first locations within the first image, each of the first locations identifying a spatial position in the first image of a respective one of the fields; and extracting multiple tokens from the fields, each token corresponding to groups of alphanumeric data within the digital image of the first document;

generating, using a first trained machine learning (ML) model, based at least on the first image, the first locations, and the tokens, multiple first predictions, each of the first predictions indicating a classification of a respective one of the tokens, the classifications corresponding to a data type of the respective token determined from a set of classifications;

generating, using a second trained ML model, different from the first trained ML model and based at least on the first image, multiple second predictions identifying multiple second locations, each of the second locations identifying a spatial position in the first image of a respective entry of multiple entries, each of the entries including one or more rows of tokens;

linking, according to the first locations and the second locations, each of the tokens to one of the entries;

populating a data structure with the tokens extracted from the first digital image of the first document based on the classifications and the entries linked to the tokens; and storing the data structure in a database.

2. The non-transitory computer-readable medium of claim 1, wherein the operations further comprise: after linking each of the tokens to one of the entries, generating a table comprising multiple records, each of the records comprising an entry and one or more of the tokens linked to the entry.

3. The non-transitory computer-readable medium of claim 1, wherein the operations further comprise: transmitting each token jointly with the classification corresponding to the token.

4. The non-transitory computer-readable medium of claim 1, wherein the classification of at least some of the tokens comprises a class of the token and a position of the token within a sequence.

5. The non-transitory computer-readable medium of claim 4, wherein:

the first document is a loss run document; and the class of the token is selected from the group comprising: a loss run start date, a loss run end date, a loss amount, a policy number, a policyholder name, a claim number, or a claimant name.

6. The non-transitory computer-readable medium of claim 1, wherein the operations further comprise constructing the first trained model by:

pretraining, using a masked language modeling process, input weights of an input model; and after pretraining the input weights, constructing a token classification model from the input model.

28

7. The non-transitory computer-readable medium of claim 1, wherein the operations further comprise:

determining that the first document is not formatted in accordance with any of multiple document templates; and in response to determining that the first document is not formatted in accordance with any of the multiple document templates, performing the operations of determining the first locations, extracting the multiple tokens, generating the first locations, generating the second locations, and linking each of the tokens to one of the entries.

8. The non-transitory computer-readable medium of claim 1, wherein the operations further comprise:

obtaining a second image of a second document containing multiple fields spatially arranged along multiple dimensions;

determining that the second document is formatted in accordance with a first document template of multiple document templates; and in response to determining that the second document is formatted in accordance with the first document template, extracting, according to the first document template, information from the fields of the second document.

9. The non-transitory computer-readable medium of claim 8, wherein determining that the second document is formatted in accordance with the first document template comprises:

extracting a first document signature from the document, the first document signature comprising at least one item of information that is the same across multiple entries of a table of the second document; and comparing the first document signature to a second document signature of the first document template.

10. The non-transitory computer-readable medium of claim 8, wherein extracting, according to the first document template, information from the fields of the second document, comprises:

determining, for each field of the multiple fields, according to the first document template, a regular expression expected for an item of information of each field; and determining whether or not the item of information of each field is consistent with the regular expression that is expected for the item of information.

11. The non-transitory computer-readable medium of claim 10, wherein extracting, according to the first document template, information from the fields of the second document, further comprises: in response to determining that a first item of information of a first field of the multiple fields is inconsistent with the regular expression that is expected for the first item of information, using a backtracking algorithm to find a correct item of information associated with the first field.

12. The non-transitory computer-readable medium of claim 1, wherein each of the first locations comprises a set of field coordinates identifying the spatial position of the respective one of the fields, and each of the second locations comprises a set of entry coordinates identifying the spatial position of the respective entry.

13. The non-transitory computer-readable medium of claim 1, wherein:

the first trained model comprises a transformer architecture including a spatial-aware self-attention mechanism configured to process relative positional relationships among items of information; and the second trained model comprises an architecture comprising a convolutional neural network and a transformer.

14. The non-transitory computer-readable medium of claim 1, wherein the operations further comprise:

determining, using a third trained model, based at least on a filename of the first document, a predicted class of the first document;

after determining the predicted class of the first document, determining that the first document is not formatted in accordance with any of multiple document templates corresponding to the predicted class; and in response to determining that the first document is not formatted in accordance with any of multiple document templates corresponding to the predicted class, performing the operations of determining the first locations, extracting the multiple tokens, generating the first locations, generating the second locations, and linking each of the tokens to one of the entries.

15. A non-transitory computer-readable medium having executable instructions stored thereon that, when executed by a processor, causes the processor to perform operations comprising:

obtaining a first digital image of a first document containing multiple fields spatially arranged along multiple dimensions, the multiple fields corresponding to locations of alphanumeric data within the digital image of the first document;

predicting, using one or more machine learning (ML) models and based on one or more features of the first document, a classification of the first document;

determining, based on the predicted classification, that the first document is formatted in accordance with a first document template of multiple document templates;

in response to determining that the first document is formatted in accordance with the first document template, extracting, according to the first document template, information from the fields of the first document by:

determining, for each field of the multiple fields, according to the first document template, a regular expression expected for an item of information of each field;

determining whether or not the item of information of each field is consistent with the regular expression that is expected for the item of information; and when it is determined the item of information in a particular field is consistent with the regular expression that is expected for the item of information, extracting, using an optical character recognition (OCR) engine, alphanumeric data from the particular field of the first digital image of the first document;

populating a data structure with the alphanumeric data extracted from the first digital image of the first document based on the first document template; and storing the data structure in a database.

16. The non-transitory computer-readable medium of claim 15, wherein determining that the first document is formatted in accordance with the first document template comprises:

extracting a first document signature from the document, the first document signature comprising at least one item of information that is the same across multiple entries of a table of the first document; and comparing the first document signature to a second document signature of the first document template.

17. The non-transitory computer-readable medium of claim 15, wherein extracting, according to the first document template, information from the fields of the first document, further comprises: in response to determining that a first item of information of a first field of the multiple fields is inconsistent with the regular expression that is expected for the first item of information, using a backtracking algorithm to find a correct item of information associated with the first field.

18. The non-transitory computer-readable medium of claim 15, wherein the operations further comprise:

determining, using a trained model, based at least on a filename of the first document, a predicted class of the first document as a loss run; and in response to determining the predicted class of the first document as a loss run, performing the operation of determining that the first document is formatted in accordance with the first document template.

19. A method, comprising:

using at least one computer hardware processor to perform:

obtaining, at a computing device, a first digital image of a first document containing multiple fields spatially arranged along multiple dimensions, the multiple fields corresponding to locations of alphanumeric data within the digital image of the first document;

using an optical character recognition (OCR) engine to perform:

determining, at the computing device, multiple first locations within the first image, each of the first locations identifying a spatial position in the first image of a respective one of the fields; and extracting, at the computing device, multiple tokens from the fields, each token corresponding to groups of alphanumeric data within the digital image of the first document;

generating, at the computing device, using a first trained machine learning (ML) model, based at least on the first image, the first locations, and the tokens, multiple first predictions, each of the first predictions indicating a classification of a respective one of the tokens, the classifications corresponding to a data type of the respective token determined from a set of classifications;

generating, at the computing device, using a second trained ML model, different from the first trained ML model and based at least on the first image, multiple second predictions identifying multiple second locations, each of the second locations identifying a spatial position in the first image of a respective entry of multiple entries, each of the entries including one or more rows of tokens;

linking, at the computing device, according to the first locations and the second locations, each of the tokens to one of the entries;

populating a data structure with the tokens extracted from the first digital image of the first document based on the classifications and the entries linked to the tokens; and storing the data structure in a database.

20. The method of claim 19, further comprising: after linking each of the tokens to one of the entries, generating, at the computing device, a table comprising multiple records, each of the records comprising an entry and one or more of the tokens linked to the entry.

* * * * *